United States Patent [19]
Hashizume et al.

[11] Patent Number: 6,109,751
[45] Date of Patent: Aug. 29, 2000

[54] PROJECTOR AND LIGHTING OPTICAL SYSTEM THEREFOR

[75] Inventors: Toshiaki Hashizume; Yoshitaka Itoh, both of Suwa, Japan

[73] Assignee: Seiko Epson Corporation, Tokyo, Japan

[21] Appl. No.: 09/091,830

[22] PCT Filed: Oct. 27, 1997

[86] PCT No.: PCT/JP97/03900

§ 371 Date: Jun. 26, 1998

§ 102(e) Date: Jun. 26, 1998

[87] PCT Pub. No.: WO98/19211

PCT Pub. Date: May 7, 1998

[30] Foreign Application Priority Data

Oct. 30, 1996 [JP] Japan .................................... 8-305734
Mar. 26, 1997 [JP] Japan .................................... 9-093003

[51] Int. Cl.[7] .................................................. G03B 21/14
[52] U.S. Cl. ................................................. 353/38; 353/31
[58] Field of Search .................................. 353/20, 22, 31, 353/34, 38, 69; 349/5, 7, 8, 9; 359/621, 622, 623, 624

[56] References Cited

U.S. PATENT DOCUMENTS

| | | |
|---|---|---|
| 4,850,685 | 7/1989 | Kamakura et al. . |
| 5,005,968 | 4/1991 | Tejima et al. .............................. 353/38 |
| 5,098,184 | 3/1992 | Van Den Brandt et al. . |
| 5,250,967 | 10/1993 | Miyashita .................................... 353/38 |
| 5,418,583 | 5/1995 | Masumoto ................................... 353/38 |
| 5,580,144 | 12/1996 | Stroomer ................................... 353/38 |
| 5,786,939 | 7/1998 | Watanabe ................................... 353/38 |
| 5,826,959 | 10/1998 | Atsuchi ...................................... 353/20 |
| 5,865,521 | 2/1999 | Hashizume et al. ....................... 353/38 |
| 5,971,546 | 10/1999 | Park ........................................... 353/38 |

FOREIGN PATENT DOCUMENTS

| | | |
|---|---|---|
| 646828 | 4/1995 | European Pat. Off. . |
| 1-30385 | 12/1989 | Japan . |
| 3-71342 | 7/1991 | Japan . |
| 9-113994 | 5/1997 | Japan . |
| 10-170869 | 6/1998 | Japan . |

*Primary Examiner*—William C. Dowling
*Attorney, Agent, or Firm*—Oblon, Spivak, McClelland, Maier & Neustadt, P.C.

[57] ABSTRACT

The structure of the present invention makes dark lines due to a central axis of a cross dichroic prism sufficiently inconspicuous. A stepped reflecting mirror is interposed between a second lens array and a condenser. The stepped reflecting mirror has the function of deviating the optical path of part of the partial light fluxes among a plurality of partial light fluxes passing through a plurality of small lenses aligned on the same column in lens arrays from the optical path of the other partial light fluxes. A planar transparent member may be used in place of the stepped reflecting mirror for the purpose of deviating the optical path. Another technique shifts part of rows in the lens arrays and to deviate the optical path of part of the partial light fluxes.

36 Claims, 18 Drawing Sheets

PROJECTION DISPLAY APPARATUS 2000

Fig. 8(A)
Fig. 8(C)
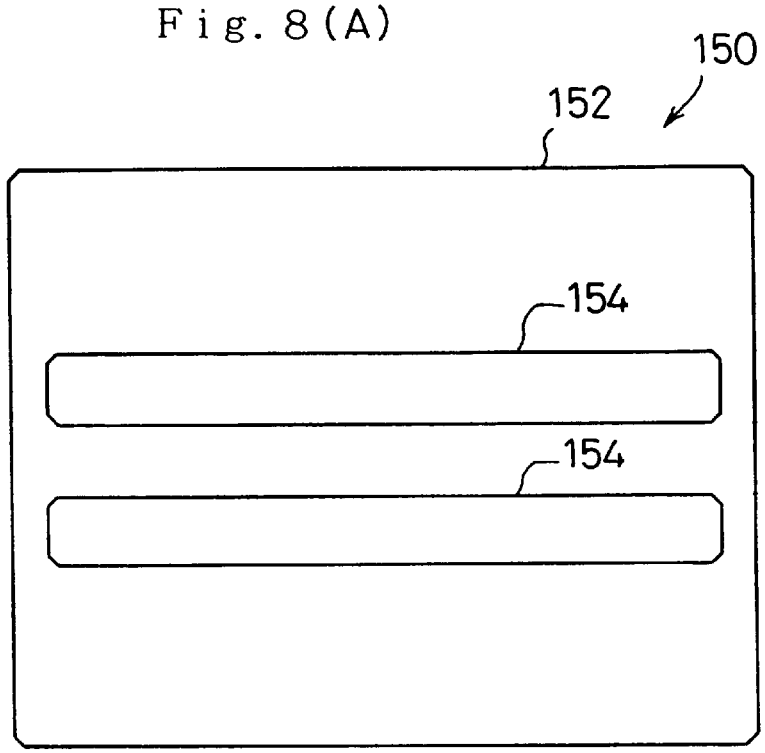
Fig. 8(B)

PROJECTION DISPLAY APPARATUS 2000

Fig. 13(A) LENS ARRAYS 120 AND 130 IN FIRST EMBODIMENT
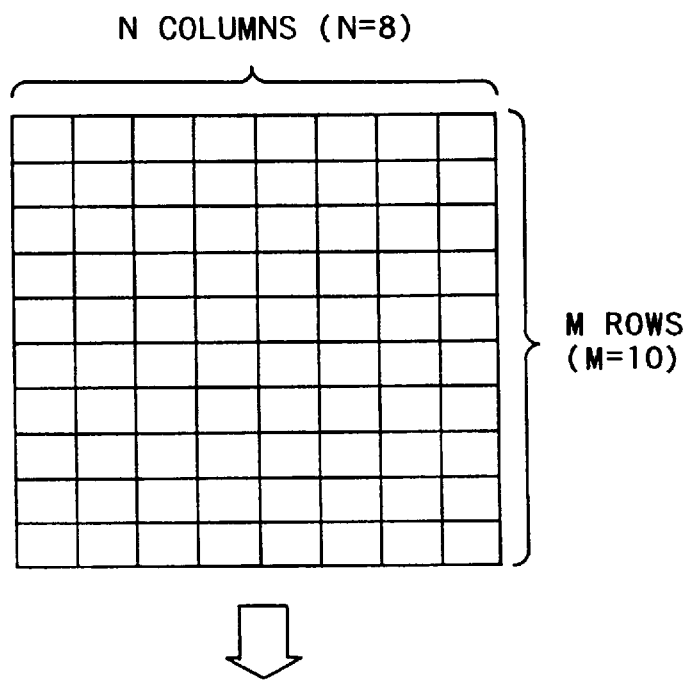
Fig. 13(B) LENS ARRAYS 124 AND 134 IN THIRD EMBODIMENT
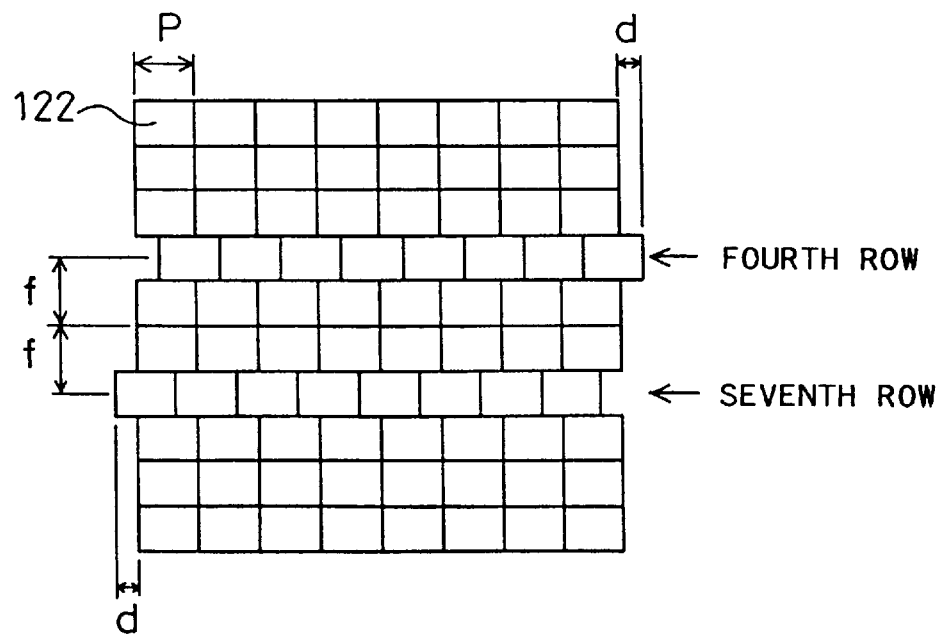

Fig. 15(A) POLARIZING ELEMENT 140 IN FIRST EMBODIMENT
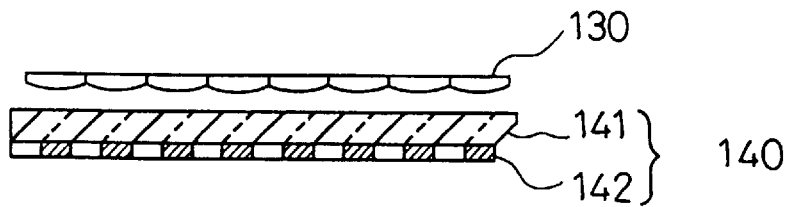
Fig. 15(B)
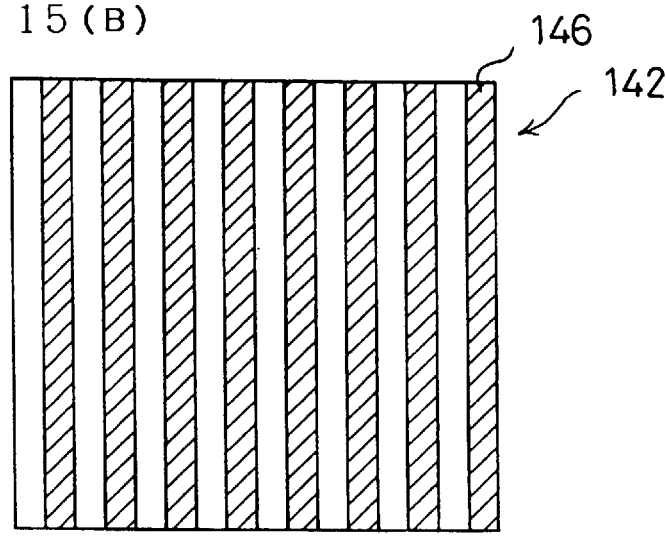
Fig. 15(C) THIRD EMBODIMENT
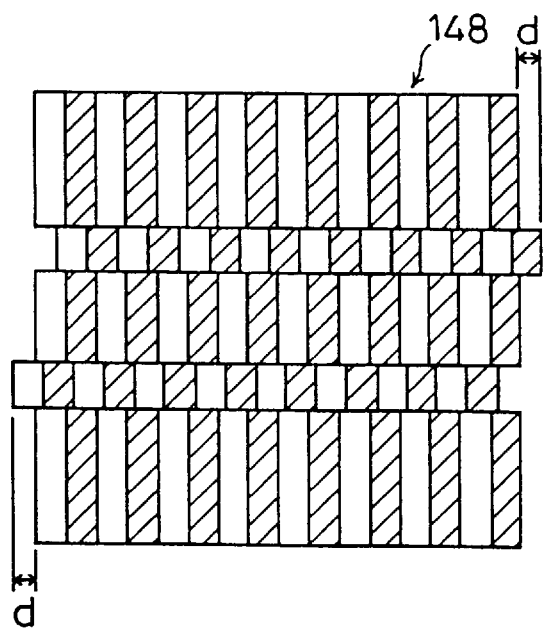
Fig. 15(D) THIRD EMBODIMENT
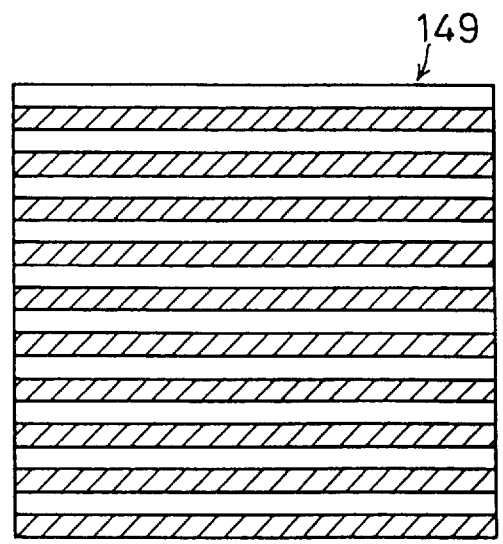

Fig. 16(A) LENS ARRAYS 120 AND 130 IN FIRST EMBODIMENT
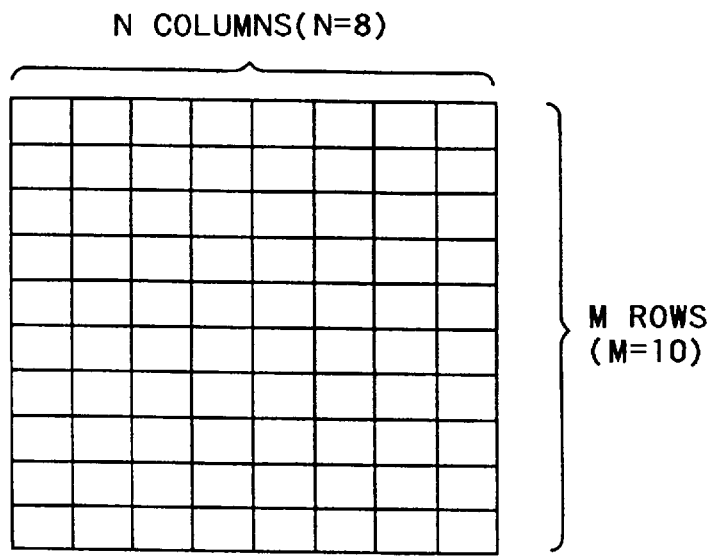
Fig. 16(B) LENS ARRAYS 126 AND 136 IN FOURTH EMBODIMENT
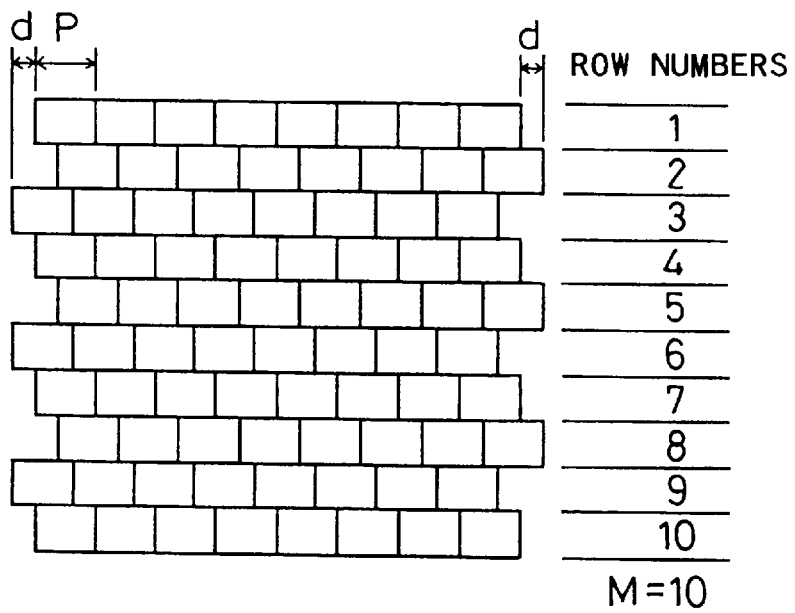

PROJECTION DISPLAY APPARATUS

CROSS DICHROIC PRISM 48

PROJECTOR AND LIGHTING OPTICAL SYSTEM THEREFOR

BACKGROUND OF THE INVENTION

1. Field of the Invention

The present invention relates to a projection display apparatus with colored light combining means and a lighting optical system therefor.

2. Discussion of the Background

A cross dichroic prism is often used for projection display apparatus that project a color image on a projection screen. For example, in a transmissive liquid-crystal projector, the cross dichroic prism is utilized as colored light combining means that combines three colored rays of red, green, and blue and emits the composite light in a common direction. In a reflective liquid-crystal projector, the cross dichroic prism is utilized as colored light separation means that separated a beam of white light into three colored rays of red, green, and blue and also as colored light combining means that recombines modulated three colored rays and emits the composite light in a common direction. A known example of the projection display apparatus with the cross dichroic prism is disclosed in JAPANESE PATENT LAID-OPEN GAZETTE No. 1-302385.

FIG. 17 conceptually illustrates a main part of a projection display apparatus. The projection display apparatus includes three liquid-crystal light valves 42, 44, and 46, a cross dichroic prism 48, and a projection lens system 50. The cross dichroic prism 48 combines three colored rays of red, green, and blue modulated by the three liquid-crystal light valves 42, 44, and 46 and emits the composite light toward the projection lens system 50. The projection lens system 50 focuses the composite light on a projection screen 52.

FIG. 18 is a partly decomposed perspective view illustrating the cross dichroic prism 48. The cross dichroic prism 48 includes four right-angle prisms which are bonded to one another via the respective right-angle surfaces by an optical adhesive.

In the projection display apparatus using a cross dichroic prism as the colored light combining means, according to the optical characteristics of a light source applied, scattering of light at a joint of four right-angle prisms may cause a dark shadow on a projected image.

FIG. 19 shows a problem arising in the case of utilizing the cross dichroic prism 48. As shown in FIG. 19(A), the cross dichroic prism 48 has a red light reflection film 60R and a blue light reflection film 60B which are arranged in a substantially X shape on an X-shaped interface formed by the right-angle surfaces of the four right-angle prisms. There is a layer of optical adhesive 62 formed in the gaps between the four right-angle prisms. Both the reflection films 60R and 60B accordingly have gaps at a central axis 48a of the cross dichroic prism 48.

When a light beam passing through the central axis 48a of the cross dichroic prism 48 is projected on the projection screen 52, a dark line due to the central axis 48a may be formed in the projected image. FIG. 19(B) shows an example of the dark line DL. The dark line DL represents a relatively dark, linear area having a different color from that of the other part and is formed substantially on the center of the projected image. It is considered that the dark line DL is ascribed to scattering of rays and no-reflection of the red light and blue light in the gaps of the reflection films in the vicinity of the central axis 48a. A similar problem arises in a cross dichroic mirror that includes two dichroic mirrors that are arranged in an X shape and respectively have selective reflection films, such as a red reflection film and a blue reflection film. In this case, a dark line due to a central axis of the mirror is formed in a projected image.

As described above, in the prior-art projection display apparatus, a dark line is formed substantially on the center of a projected image because of the central axis of the cross dichroic prism 48 or the cross dichroic mirror.

SUMMARY OF THE INVENTION

In order to solve the above problem in the prior art, one object of the present invention is to provide a technique that makes a dark line due to a central axis of colored light combining means inconspicuous, where the colored light combining means includes two dichroic films arranged substantially in an X shape and may be a cross dichroic prism or a cross dichroic mirror. Another object of the present invention is to realize a lighting optical system and a projection display apparatus based on this technique.

The principle for solving the problem is described first with a concrete example shown in FIGS. 1 through 4. In the drawings, z direction denotes direction of the course of light, x direction denotes the direction of 3 o'clock seen from the direction of the course of light (the z direction), and y direction denotes the direction of 12 o'clock. In the description below, the x direction represents the direction of rows and the y direction represents the direction of columns for the matter of convenience. Although the description of the principle is based on a concrete example for the better understanding, the present invention is not restricted to this concrete structure in any sense.

In a projection display apparatus, a lighting optical system with two lens arrays each including a plurality of small lenses (hereinafter referred to as an integrator optical system) as specified in WO94/22042 is known as the technique for dividing light from a light source into a plurality of partial light fluxes and thereby reducing an in-plane unevenness of the illuminance of light.

FIG. 1 shows the principle of forming a dark line when an integrator optical system is adopted in a projection display apparatus with a cross dichroic prism. FIGS. 1(A-1) and 1(B-1) show light fluxes (shown by the solid lines) passing through a plurality of small lenses 10 which are different in position in the x direction, that is, a plurality of small lenses 10 existing in different columns, and traces of their central optical axes (shown by the fine dotted lines). FIGS. 1(A-2) and 1(B-2) show the positions of dark lines DLa and DLb formed on a projection screen 7.

A light flux emitted from a light source (not shown) is divided into a plurality of partial light fluxes by first and second lens arrays 1 and 2 each including the plurality of small lenses 10. The light fluxes passing through the respective small lenses 10 included in the first and the second lens arrays 1 and 2 are converted to light fluxes parallel to the respective central axes of the light fluxes by means of a paralleling lens 15. The light fluxes passing through the paralleling lens 15 are superposed on a liquid-crystal light valve 3, so that a predetermined area is uniformly illuminated with the superposed light fluxes. Although only one liquid-crystal light valve 3 is shown in FIG. 1, the principle of the integrator optical system and the principle of forming a dark line are also applicable to the other two liquid-crystal light valves.

FIG. 2 is a perspective view illustrating the appearance of the lens arrays 1 and 2. Each of the first and the second lens arrays 1 and 2 includes the small lenses 10 that respectively have a substantially rectangular outline and are arranged in a matrix of M rows and N columns. In this example, M=10 and N=8. FIG. 1(A-1) shows the trace of partial light fluxes passing through the small lenses 10 of the second column, whereas FIG. 1(B-1) shows the trace of partial light fluxes passing through the small lenses 10 of the seventh column.

The light fluxes superposed on the liquid-crystal light valve 3 are subjected to modulation responsive to image information in the liquid-crystal light valve 3 and enter a cross dichroic prism 4. The light flux output from the cross dichroic prism 4 is projected on the projection screen 7 via a projection lens system 6.

As shown by the rough dotted lines in FIGS. 1(A-1) and 1(B-1), light fluxes passing through a central axis 5 (along the y direction in the drawing) of the cross dichroic prism 4 are projected at positions Pa and Pb on the projection screen 7. As discussed previously as the problem addressed by the invention, scattering of the rays and no-reflection of the light to be reflected in the gaps between reflection films in the vicinity of the central axis 5 reduce the quantity of light passing through the vicinity of the central axis 5. As shown in FIGS. 1(A-2) and 1(B-2), the reduction causes dark lines DLa and DLb, which have the lower luminance than the area around on the projection screen 7.

The dark line has the following relation to the first and the second lens arrays 1 and 2. As clearly shown in FIG. 3(A), which is a partial enlarged view of FIG. 1(A-1), the image formed by the liquid-crystal light valve 3 is inverted and magnified by the projection lens system 6 and projected on the projection screen 7. FIG. 3(B) is a cross sectional view showing an x-y plane including the central axis 5 of the cross dichroic prism 4. Referring to FIGS. 3(A) and 3(B), in case that a partial light flux is cut by the x-y plane including the central axis 5 of the cross dichroic prism 4, r1 denotes a distance from one end 11 of a cross section 8 of the partial light flux to the central axis 5, and r2 denotes a distance from the other end 12 of the cross section 8 of the partial light flux to the central axis 5. The image of the cross section 8 of the partial light flux is inverted and magnified by the projection lens system 6 and projected on the projection screen 7. A ratio of a distance R2 from one end 13 of a projection area 9 on the projection screen 7 to the dark line DLa to a distance R1 from the other end 14 of the projection area 9 to the dark line DLa is accordingly equal to the ratio of r2 to r1. In other words, the position where the dark line DLa is formed depends upon the position where the cross section 8 of the partial light flux exists relative to the central axis 5 in the x-y plane including the central axis 5 of the cross dichroic prism 4.

In the examples of FIGS. 1(A-l) and 1(B-1), the partial light fluxes have cross sections at different positions in the x-y plane including the central axis 5 of the cross dichroic prism 4. This means that the dark lines DLa and DLb are formed at different positions. In a similar manner, the partial light fluxes passing through the small lenses 10 existing in the columns other than the second column and the seventh column in the first and the second lens arrays 1 and 2 have cross sections at different positions in the x-y plane including the central axis 5 of the cross dichroic prism 4. A number of dark lines corresponding to the number of columns included in the first and the second lens arrays 1 and 2, N dark lines in this example, are thus formed on the projection screen 7.

The partial light fluxes passing through the M small lenses aligned on the same column in the first and the second lens arrays 1 and 2 form dark lines DLc at approximately the same position on the projection screen 7 as shown in FIG. 4. Each of the N dark lines is formed by superposing the partial light fluxes passing through the M small lenses aligned on the same column in the first and the second lens arrays 1 and 2. The degree of darkness of each dark line is substantially identical with the summation of the degree of darkness of the dark lines formed by the respective small lenses.

The above description leads to the following principles.

First Principle

The first principle is that the different positions of the central optical paths of the partial light fluxes relative to the central axis 5 of the cross dichroic prism 4 cause dark lines to be formed at different positions. The partial light fluxes passing through the different columns included in the first and the second lens arrays 1 and 2 are different in position relative to the central axis 5 of the cross dichroic prism 4 and thereby form dark lines at different positions.

Second Principle

The second principle is that the different positions of the cross sections of the partial light fluxes in the x-y plane including the central axis 5 of the cross dichroic prism 4 are ascribed to the difference in incident angles of the partial light fluxes entering the cross dichroic prism 4 (see FIG. 1). The partial light fluxes passing through the different columns included in the first and the second lens arrays 1 and 2 enter the cross dichroic prism 4 at different incident angles and thereby have cross sections at different positions relative to the central axis 5.

Namely different incident angles of the partial light fluxes entering the cross dichroic prism 4 or different angles of the partial light fluxes superposed on the liquid-crystal light valve 3 cause dark lines to be formed at different positions.

Method of Making Dark Lines Inconspicuous

As discussed previously, the partial light fluxes passing through the M small lenses aligned on the same column in the first and the second lens arrays 1 and 2 respectively form dark lines at substantially the same position on the projection screen 7. The degree of darkness of each resulting dark line is substantially equal to the summation of the degree of darkness of the dark lines formed by the respective small lenses. A desired arrangement accordingly causes dark lines to be formed at different positions on the projection screen 7 by the respective partial light fluxes passing through the M small lenses. Although increasing the total number of dark lines, this arrangement decreases the degree of darkness per each dark line, thereby making each dark line sufficiently inconspicuous. It is, however, not required to cause all the dark lines to be formed at different positions by the respective partial light fluxes passing through the M small lenses. One preferable application accordingly causes only part of the dark lines to be formed at different positions.

Formation of dark lines at different positions is realized according to the first principle and the second principle discussed above.

Based on the first principle, as for part of the partial light fluxes passing through the M small lenses arranged on the same direction of columns, the positions of the central axes of the partial light fluxes relative to the central axis 5 of the cross dichroic prism 4 should be changed from the others.

Based on the second principle, as for part of the partial light fluxes passing through the M small lenses arranged on the same direction of columns, the angles of the partial light fluxes superposed on the liquid-crystal light valve 3 or the incident angles of the partial light fluxes entering the cross dichroic prism 4 should be changed from the others.

The present invention has solved the problem of the prior art discussed previously according to the above principles.

The following describes the means for solving the problem and its functions and effects.

Means for Solving the Problems and its Functions and Effects

A first projection display apparatus is a projection display apparatus comprising: a lighting optical system which emits light; colored light separation means which separates the light into three colored rays; three light modulation means which respectively modulate the three colored rays based on given image signals; colored light combining means which has two dichroic films arranged in an X shape and a central axis corresponding to a position where the two dichroic films cross each other, the colored light combining means combining the three colored rays respectively modulated by the three light modulation means to composite light and outputting the composite light in a common direction; and projection means which projects the composite light output from the colored light combining means on a projection surface, wherein the lighting optical system comprises a dividing and superposing optical system that divides a light flux into a plurality of partial light fluxes, which are arranged in a direction of columns substantially parallel to the central axis of the colored light combining means and in a direction of rows substantially perpendicular to the central axis of the colored light combining means, and superposes the plurality of partial light fluxes, and wherein the dividing and superposing optical system is constructed to shift a position where the central axis is projected on the projection surface by part of the partial light fluxes among the partial light fluxes on an identical column from a position where the central axis is projected by the other partial light fluxes on the identical column, the positional shift being in a direction different from a direction corresponding to the central axis.

One partial light flux projects the central axis of the colored light combining means on the projection surface to form a dark line corresponding to the central axis. A plurality of partial light fluxes aligned on one column generally project the central axis of the colored light combining means at substantially the same position on the projection surface to form a dark line. The arrangement of the present invention causes part of the partial light fluxes among the plurality of the partial light fluxes on one column to project the central axis of the colored light combining means as a dark line at a different position on the projection surface from the position of the central axis projected by the other partial light fluxes. This structure makes the dark lines formed on the projected image sufficiently inconspicuous.

In accordance with one preferred arrangement of the first projection display apparatus, the dividing and superposing optical system comprises: light flux dividing means which divides the light flux into the plurality of partial light fluxes; and incident angle changing means that causes the part of the partial light fluxes among the partial light fluxes on the identical column to enter the colored light combining means at an incident angle different from that of the other partial light fluxes.

It is further preferable that the light flux dividing means has at least one lens array having a plurality of small lenses arranged in the directions of columns and rows, and the incident angle changing means has a stepped reflecting mirror having a step part on a reflecting surface thereof.

In another example, it is also preferable that the light flux dividing means has at least one lens array having a plurality of small lenses arranged in the directions of columns and rows, and the incident angle changing means has a transparent member arranged to be inclined relative to a surface of the lens array.

This preferable arrangement enables the position of the central optical path of the part of the partial light fluxes relative to the central axis of the colored light combining means to be deviated from the position of the central optical path of the other partial light fluxes. The part of the partial light fluxes and the other partial light fluxes accordingly form dark lines at different positions. This makes the dark lines formed on the projected image sufficiently inconspicuous. Either one of the above combinations makes the dark lines formed on the projected image more inconspicuous.

A second projection display apparatus is a projection display apparatus comprising: a lighting optical system which emits light; colored light separation means which separates the light into three colored rays; three light modulation means which respectively modulate the three colored rays based on given image signals; colored light combining means which has two dichroic films arranged in an X shape and a central axis corresponding to a position where the two dichroic films cross each other, the colored light combining means combining the three colored rays respectively modulated by the three light modulation means to composite light and outputting the composite light in a common direction; and projection means which projects the composite light output from the colored light combining means on a projection surface, wherein the lighting optical system comprises: a first lens array having a plurality of small lenses that divide a light flux emitted from a light source into a plurality of partial light fluxes; a second lens array having a plurality of small lenses that respectively correspond to the plurality of small lenses of the first lens array; and optical path shifting means which shifts an optical path of part of the partial light fluxes among a plurality of partial light fluxes passing through the plurality of small lenses arranged in a predetermined direction corresponding to the central axis of the colored light combining means from an optical path of the other partial light fluxes among the plurality of partial light fluxes.

A plurality of partial light fluxes passing through the small lenses aligned in a predetermined direction corresponding to the central axis of the colored light combining means among the plurality of small lenses in the first and the second lens arrays project the central axis of the colored light combining means at substantially the same position on the projection surface to form a dark line. The optical path shifting means shifts the optical path of part of the partial light fluxes among the plurality of partial light fluxes from the optical path of the other partial light fluxes. Based on the first principle discussed above, this arrangement prevents the plurality of partial light fluxes from projecting the central axis of the colored light combining means at substantially the same position, thereby making the dark lines formed on the projected image sufficiently inconspicuous.

In accordance with one preferable arrangement of the second projection display apparatus, the optical path shifting means comprises means which shifts the optical path of the partial light fluxes passing through positions respectively apart from an optical axis of the light source by a specified distance in the predetermined direction from the optical path of the partial light fluxes passing through the other positions.

The intensity of light from the light source depends upon the distance apart from the optical axis of the light source. Shifting the optical path of the partial light fluxes having the relatively high intensity of light from the optical path of the other partial light fluxes makes the dark lines formed on the projected image sufficiently inconspicuous.

In case that the light source includes a light-source lamp and a concave mirror that reflects light emitted from the light-source lamp, it is preferable that the specified distance is substantially equal to a focal distance of the concave mirror. The partial light fluxes passing through the positions respectively apart from the optical axis of the light source by the focal distance of the concave mirror have the higher intensity of light than those of the other partial light fluxes. Shifting the optical path of the partial light fluxes passing through these specified positions from the optical path of the other partial light fluxes passing through the other positions makes the dark lines formed on the projected image sufficiently inconspicuous.

In accordance with another preferable arrangement of the second projection display apparatus, the optical path shifting means has a stepped reflecting mirror having a step part on a reflecting surface thereof. This simple arrangement can arbitrarily change the optical path of specified partial light fluxes.

It is preferable that the step part of the stepped reflecting mirror is arranged to extend in a direction perpendicular to the direction corresponding to the central axis of the colored light combining means. This arrangement enables the optical path of part of the partial light fluxes to be shifted in the direction corresponding to the central axis of the colored light combining means.

It is also preferable that the stepped reflecting mirror has a first reflecting surface and a second reflecting surface of different heights, the second reflecting surface being arranged at two different positions respectively apart from an optical axis of the light source by a specified distance in the predetermined direction corresponding to the central axis of the colored light combining means. The two second reflecting surfaces respectively change the optical path of the partial light fluxes having the relatively high intensity of light.

In another embodiment, the optical path shifting means may comprise a transparent member arranged to be inclined relative to a surface of the second lens array. This arrangement can arbitrarily change the optical path of specified partial light fluxes.

In accordance with one preferable arrangement, the lighting optical system further comprises: a polarizing element disposed at a position between the second lens array and the optical path shifting means, wherein the polarizing element comprises: a polarization beam splitter array which has plural sets of a polarization separating film and a reflecting film that are parallel to each other, the polarization beam splitter array separating each of the plurality of partial light fluxes passing through the plurality of small lenses of the second lens array into two types of linear polarized light components; and a polarizer which equalizes polarizing directions of the two types of linear polarized light components separated by the polarization beam splitter array, and wherein the optical path shifting means shifts part of optical paths of the two types of linear polarized light components, which pass through the plurality of small lenses arranged in the predetermined direction corresponding to the central axis of the colored light combining means and are separated by the polarization beam splitter array, from the other optical paths.

In the polarizing element, after the polarization beam splitter array separates the incident light into two types of linear polarized light components, the polarizer equalizes the polarizing directions of these two types of linear polarized light components. Shifting part of optical paths of the two types of linear polarized light component separated by the polarization beam splitter array from the other optical paths makes the dark lines formed on the projected image more inconspicuous.

It is preferable that an amount of shift by which the part of the optical paths of the two types of linear polarized light components are shifted from the other optical paths by the optical path shifting means is approximately half a distance between adjoining optical paths of the two types of linear polarized light components.

Shifting the optical path by approximately half the distance between the adjoining optical paths of the two types of linear polarized light components enables the optical paths of the shifted two types of linear polarized light components and those of the non-shifted two types of linear polarized light components to be arranged at substantially equal intervals. The arrangement of the four optical paths at substantially equal intervals makes the dark lines formed on the projected image most inconspicuous.

In accordance with another arrangement, the second projection display apparatus further comprises: a superposing optical system which superposes a plurality of partial light fluxes passing through the first lens array and the second lens array to illuminate the three light modulation means, wherein the optical path shifting means is disposed between the second lens array and the superposing optical system.

A third projection display apparatus is a projection display apparatus comprising: a lighting optical system which emits light; colored light separation means which separates the light into three colored rays; three light modulation means which respectively modulate the three colored rays based on given image signals; colored light combining means which has two dichroic films arranged in an X shape and a central axis corresponding to a position where the two dichroic films cross each other, the colored light combining means combining the three colored rays respectively modulated by the three light modulation means to composite light and outputting the composite light in a common direction; and projection means which projects the composite light output from the colored light combining means on a projection surface, wherein the lighting optical system comprises: a first lens array having a plurality of small lenses that divide a light flux emitted from a light source into a plurality of partial light fluxes; and a second lens array having a plurality of small lenses that respectively correspond to the plurality of small lenses of the first lens array, each of the first lens array and the second lens array being divided in a direction of rows perpendicular to a direction corresponding to the central axis of the colored light combining means into a plurality of rows each having a plurality of small lenses, wherein rows located respectively apart from an optical path of the light source by a specified distance in the direction corresponding to the central axis of the colored light combining means are arranged at positions shifted from the other rows by a fixed amount of shift.

A plurality of partial light fluxes passing through the small lenses aligned in a predetermined direction corresponding to the central axis of the colored light combining means among the plurality of small lenses in the first and the second lens arrays project the central axis of the colored light combining means at substantially the same position on the projection surface to form a dark line. In case that the light source includes a light-source lamp and a concave mirror that reflects light emitted from the light-source lamp, the partial light fluxes passing through the small lenses on specific rows existing at the positions respectively apart from the optical axis of the light source by the focal distance of the concave mirror have the relatively high intensity of light. Based on the second principle discussed above, shifting these specific rows from the other rows makes the dark lines formed on the projected image sufficiently inconspicuous.

A fourth projection display apparatus is a projection display comprising: a lighting optical system which emits light; colored light separation means which separates the light into three colored rays; three light modulation means which respectively modulate the three colored rays based on given image signals; colored light combining means which has two dichroic films arranged in an X shape and a central axis corresponding to a position where the two dichroic films cross each other, the colored light combining means combining the three colored rays respectively modulated by the three light modulation means to composite light and outputting the composite light in a common direction; and projection means which projects the composite light output from the colored light combining means on a projection surface, wherein the lighting optical system comprises: a first lens array having a plurality of small lenses that divide a light flux emitted from a light source into a plurality of partial light fluxes; and a second lens array having a plurality of small lenses that respectively correspond to the plurality of small lenses of the first lens array, each of the first lens array and the second lens array being divided in a direction of rows perpendicular to a direction corresponding to the central axis of the colored light combining means into a plurality of rows each having a plurality of small lenses, wherein at least part of the rows among the plurality of rows are arranged at a position shifted from the other rows, and a number of rows whose small lenses are arranged at identical positions in a direction perpendicular to the direction of rows is set to be not greater than two fifths of a total number of the plurality of rows.

A plurality of partial light fluxes passing through the small lenses aligned in a predetermined direction corresponding to the central axis of the colored light combining means among the plurality of small lenses in the first and the second lens arrays project the central axis of the colored light combining means at substantially the same position on the projection surface to form a dark line. In the fourth projection display apparatus, the number of rows arranged at the equivalent positions is reduced to be not greater than two fifths of the total number of rows. Based on the second principle discussed above, this structure makes the dark lines formed on the projected image sufficiently inconspicuous.

In accordance with one preferable arrangement of the fourth projection display apparatus, the plurality of rows in the first lens array and the second lens array are shifted from one another by a fixed amount of shift.

This arrangement readily reduces the number of rows arranged at the equivalent positions.

A first lighting optical system is a lighting optical system for emitting light for use in a projection display apparatus comprising: colored light separation means which separates the light into three colored rays; three light modulation means which respectively modulate the three colored rays based on given image signals; colored light combining means which has two dichroic films arranged in an X shape and a central axis corresponding to a position where the two dichroic films cross each other, the colored light combining means combining the three colored rays respectively modulated by the three light modulation means to composite light and outputting the composite light in a common direction; and projection means which projects the composite light output from the colored light combining means on a projection surface, the lighting optical system comprising: a dividing and superposing optical system that divides a light flux into a plurality of partial light fluxes, which are arranged in a direction of columns substantially parallel to the central axis of the colored light combining means and in a direction of rows substantially perpendicular to the central axis of the colored light combining means, and superposes the plurality of partial light fluxes, wherein the dividing and superposing optical system is constructed to shift a position where the central axis is projected on the projection surface by part of the partial light fluxes among the partial light fluxes on an identical column from a position where the central axis is projected by the other partial light fluxes on the identical column, the positional shift being in a direction different from a direction corresponding to the central axis.

A second lighting optical system is a lighting optical system for emitting light comprising: a first lens array having a plurality of small lenses that divide a light flux emitted from a light source into a plurality of partial light fluxes; a second lens array having a plurality of small lenses that respectively correspond to the plurality of small lenses of the first lens array; and optical path shifting means which shifts an optical path of part of the partial light fluxes among a plurality of partial light fluxes passing through the plurality of small lenses arranged in a predetermined direction from an optical path of the other partial light fluxes among the plurality of partial light fluxes.

A third lighting optical system is a lighting optical system for emitting light comprising: a first lens array having a plurality of small lenses that divide a light flux emitted from a light source into a plurality of partial light fluxes; and a second lens array having a plurality of small lenses that respectively correspond to the plurality of small lenses of the first lens array, each of the first lens array and the second lens array are divided in a direction of rows perpendicular to a predetermined direction into a plurality of rows each having a plurality of small lenses, wherein rows located respectively apart from an optical path of the light source by a specified distance in the predetermined direction are arranged at positions shifted from the other rows by a fixed amount of shift.

A fourth lighting optical system is a lighting optical system for emitting light comprising: a first lens array having a plurality of small lenses that divide a light flux emitted from a light source into a plurality of partial light fluxes; and a second lens array having a plurality of small lenses that respectively correspond to the plurality of small lenses of the first lens array, each of the first lens array and the second lens array are divided in a direction of rows perpendicular to a predetermined direction into a plurality of rows each having a plurality of small lenses, wherein at least part of the rows among the plurality of rows are arranged at a position shifted from the other rows, and a number of rows whose small lenses are arranged at identical positions in a direction perpendicular to the direction of rows is set to be not greater than two fifths of a total number of the plurality of rows.

The 'predetermined direction' in the second through the fourth lighting optical systems corresponds to that of the central axis of the colored light combining means in the projection display apparatus. The direction of rows is accordingly perpendicular to that of the central axis.

Like the first through the fourth projection display apparatuses, application of any one of the first through the fourth lighting optical systems to the projection display apparatus makes the dark lines formed on the projected image sufficiently inconspicuous.

BRIEF DESCRIPTION OF THE DRAWINGS

FIGS. 8(A), 8(B), 8(C) are plan views showing a structure of a stepped reflecting mirror 150 in the first embodiment;

FIGS. 13(A) and 13(B) are front views showing the comparison between the lens arrays used in the first embodiment and in a third embodiment;

FIGS. 15(A), 15(B), 15(C) and 15(D) show the comparison between the polarizing elements used in the first embodiment and the third embodiment;

FIGS. 16(A) and 16(B) are front views showing the comparison between the lens arrays used in the first embodiment and in a fourth embodiment;

DETAILED DESCRIPTION OF THE PREFERRED EMBODIMENTS

Figure 1:
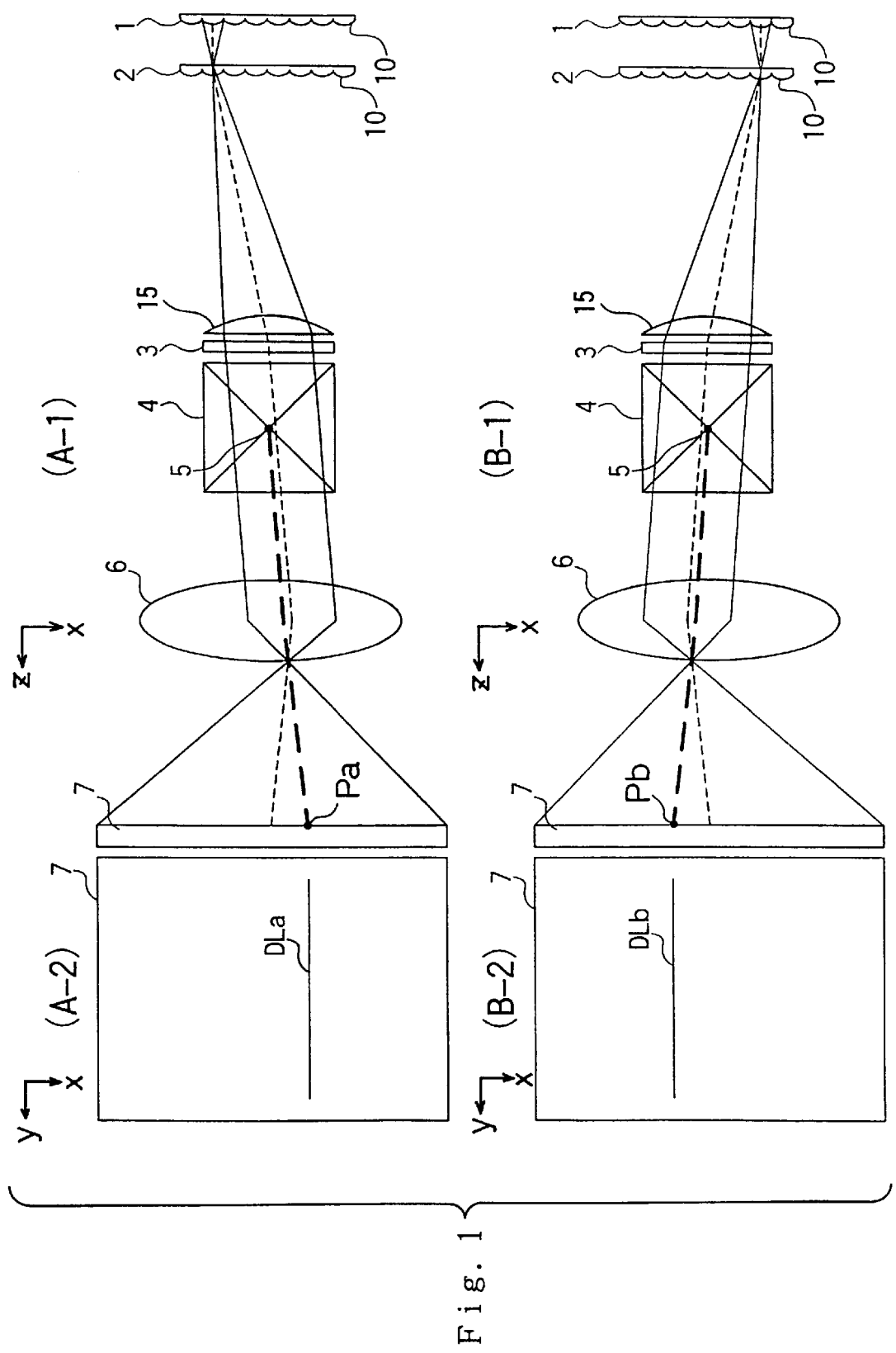
FIG. 1 shows the principle of forming a dark line when an integrator optical system is adopted in a projection display apparatus with a cross dichroic prism.
Figure 2:
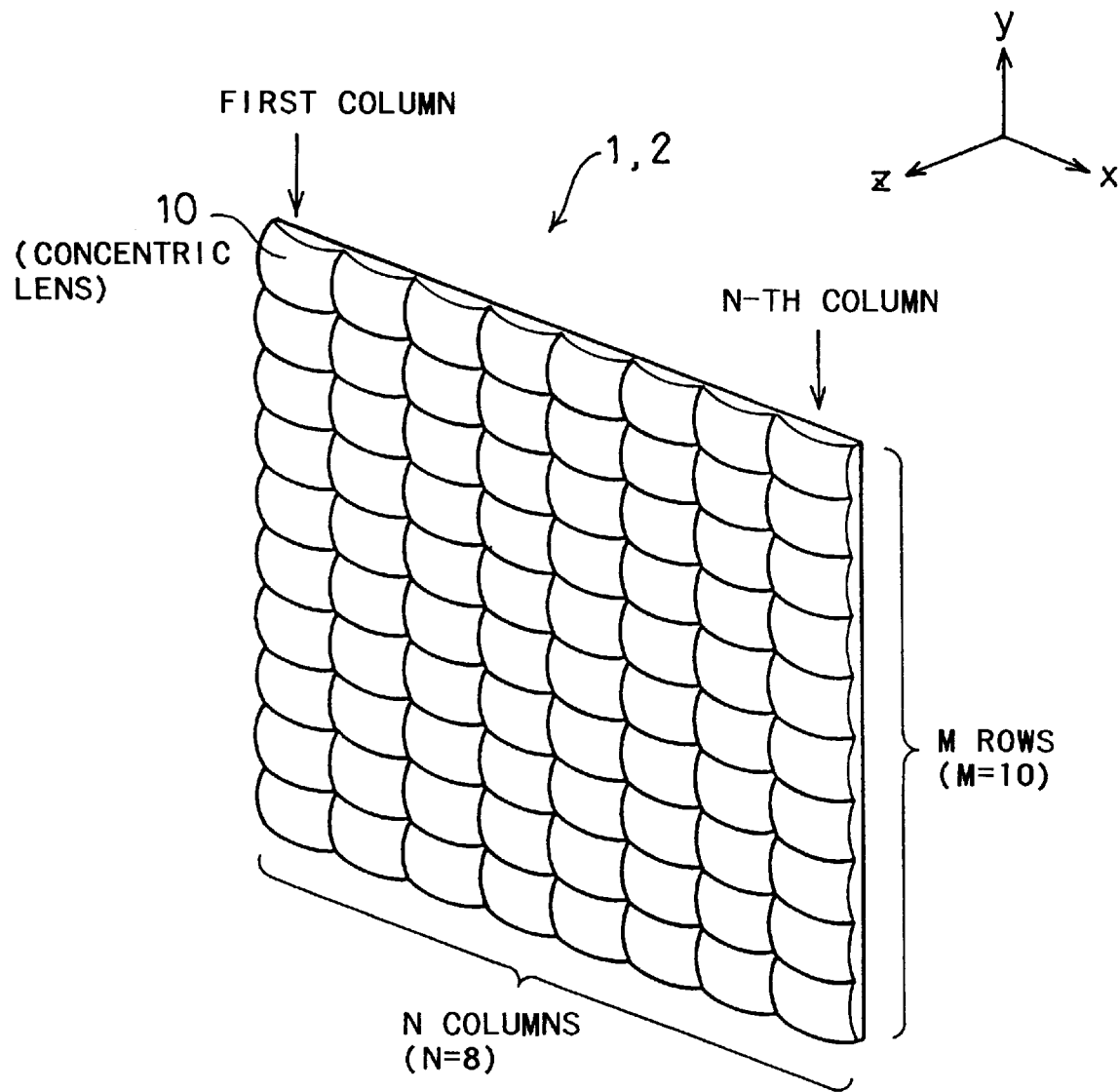
FIG. 2 is a perspective view illustrating the appearance of two lens arrays 1 and 2.
Figure 3:
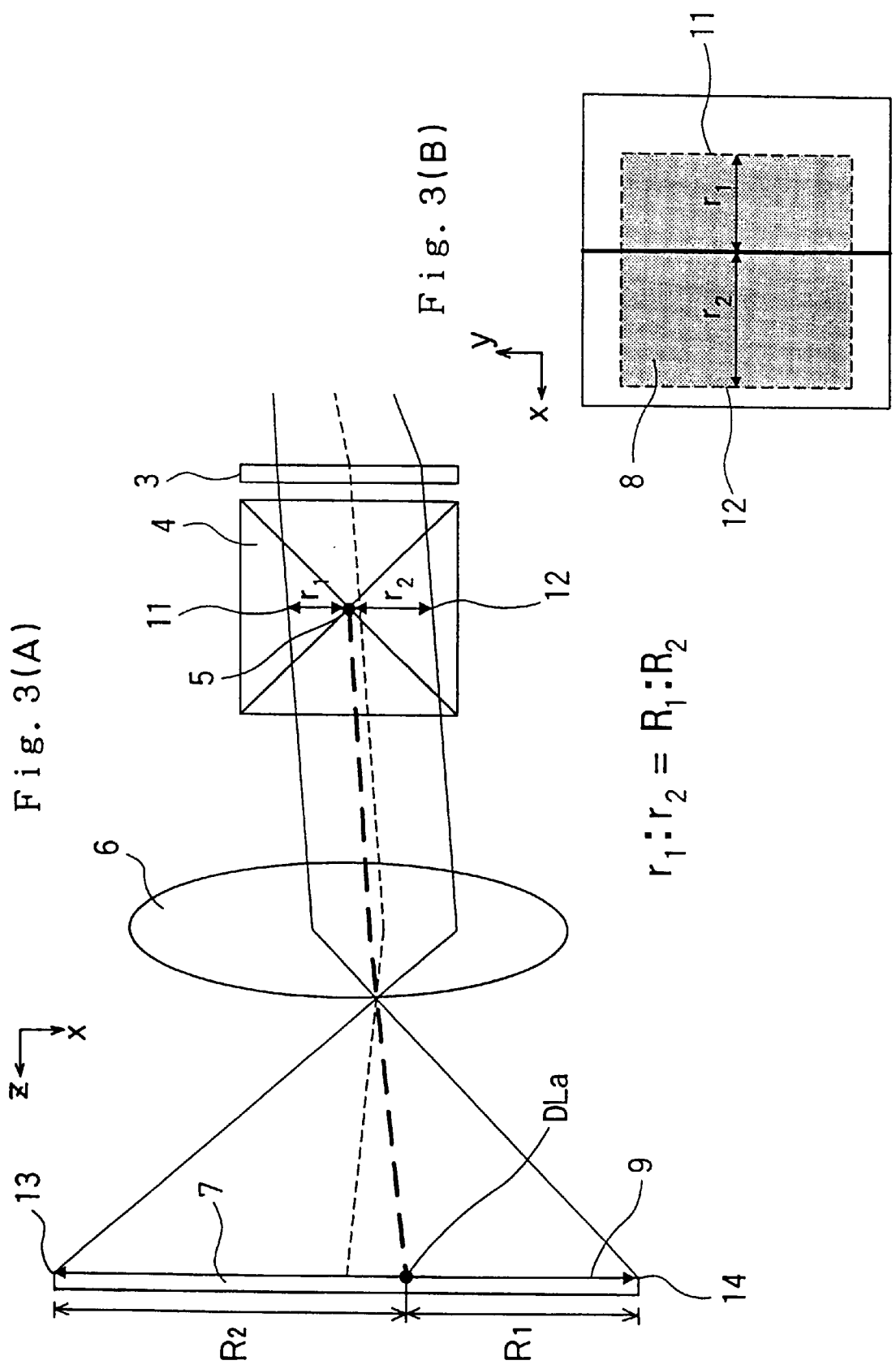
FIG. 3(A) is a partial enlarged view of FIG. 1(A-1) and FIG. 3(B) a cross sectional view showing an x-y plane including a central axis 5 of a cross dichroic prism 4.
Figure 4:
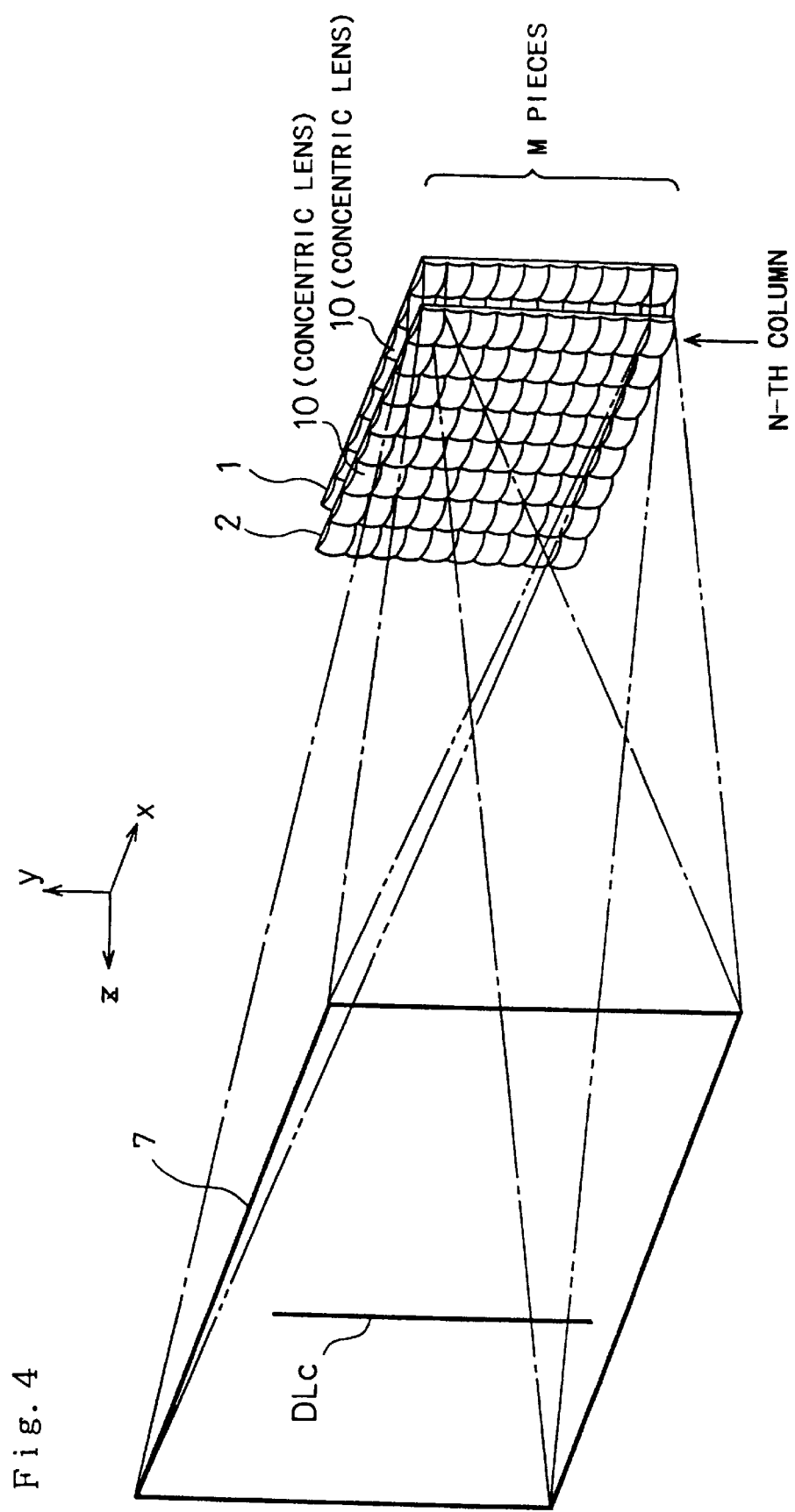
FIG. 4 conceptually shows the state in which the partial light fluxes which have passed through small lenses aligned on an N-th column in the two lens arrays 1 and 2 are projected on a projection screen 7.

The following describes some embodiments of the present invention by referring to the drawings. In the respective embodiments discussed below, z direction denotes the direction of the course of light, x direction denotes the direction of 3 o'clock seen from the z direction, and y direction denotes the direction of 12 o'clock, unless otherwise specified.

A. First Embodiment

Figure 5:
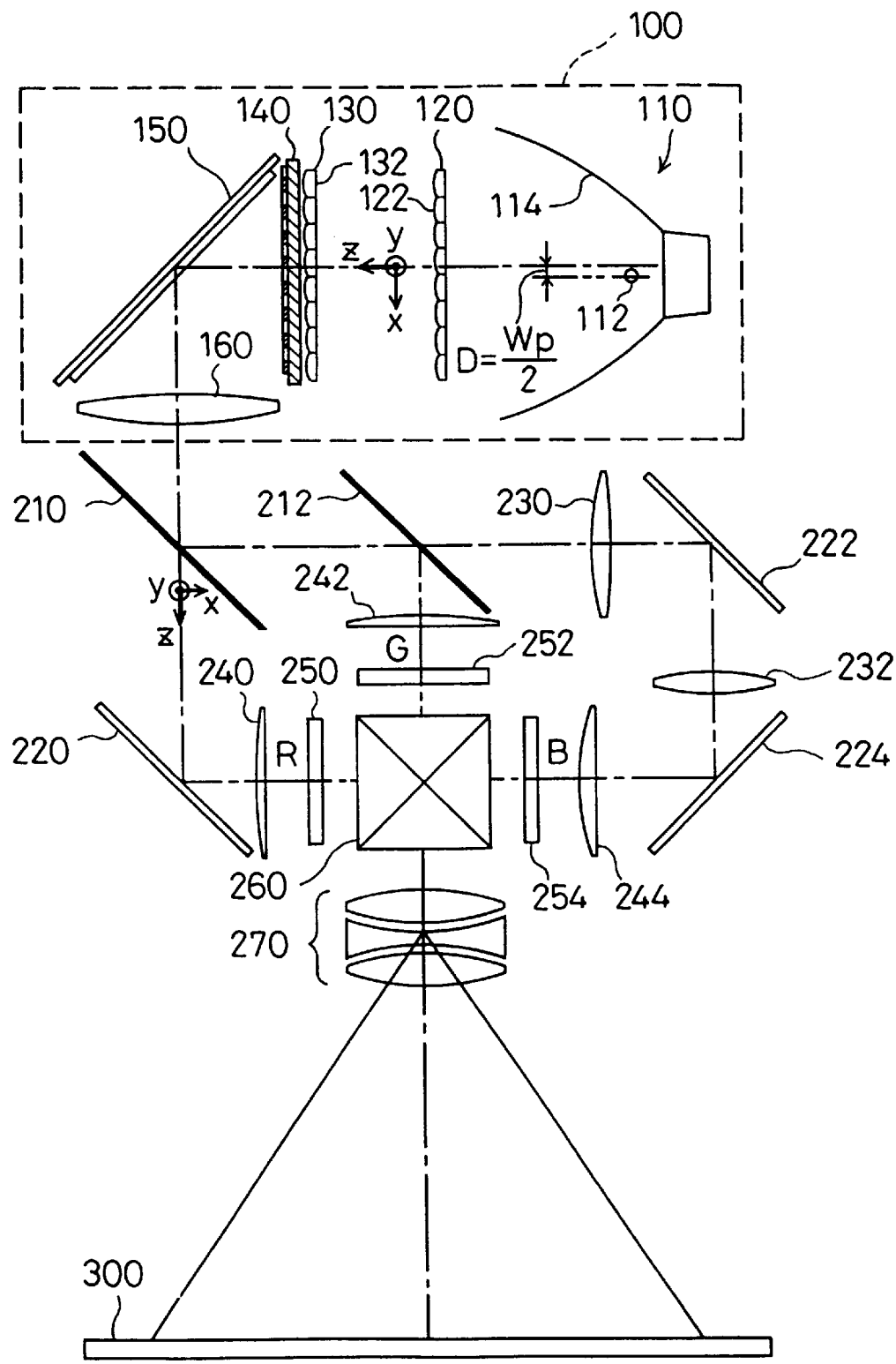
FIG. 5 is a plan view schematically illustrating a main part of a projection display apparatus 1000 as a first embodiment according to the present invention.

FIG. 5 is a plan view schematically illustrating a main part of a projection display apparatus 1000 as a first embodiment according to the present invention. The projection display apparatus 1000 includes: a lighting optical system 100; dichroic mirrors 210 and 212; reflecting mirrors 220, 222, and 224; an entrance lens 230; a relay lens 232; three field lenses 240, 242, and 244; three liquid-crystal light valves (liquid-crystal panels) 250, 252, and 254; a cross dichroic prism 260; and a projection lens system 270.

The lighting optical system 100 includes: a light source 110 that emits a substantially parallel light flux; a first lens array 120; a second lens array 130; a polarizing element 140 which converts the incident light to a predetermined linear polarized light component; a stepped reflecting mirror 150; and a superposing lens 160. The lighting optical system 100 is an optical system that substantially uniformly illuminates the three liquid-crystal light valves 250, 252, and 254.

The light source 110 has a light-source lamp 112 used as a radiant light source for emitting a radiant ray of light and a concave mirror 114 for converting the radiant ray of light emitted from the light-source lamp 112 to a substantially parallel light flux. One preferable example of the concave mirror 114 is a parabolic reflector.

Figure 6:
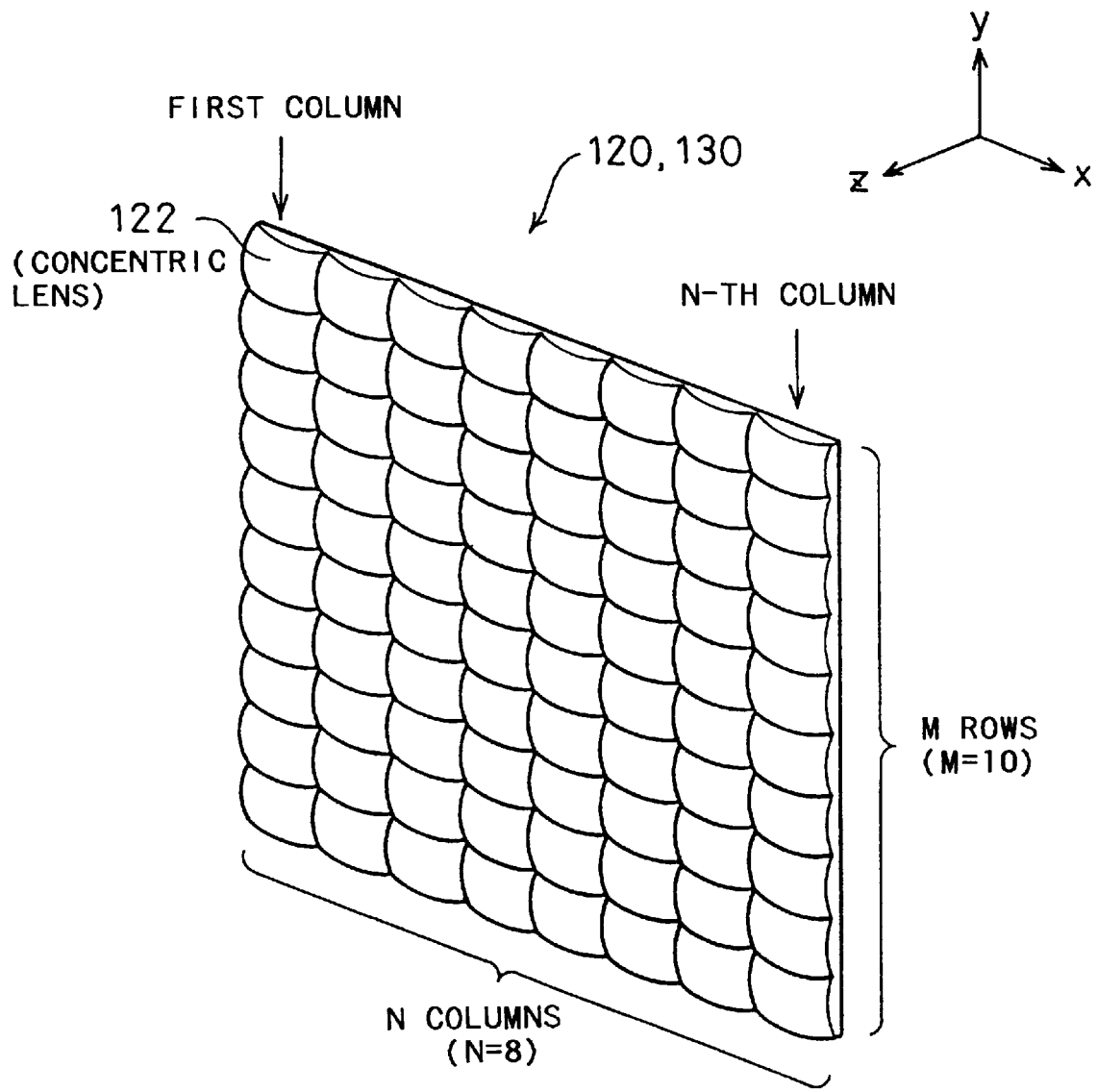
FIG. 6 is a perspective view illustrating the appearance of a first and a second lens arrays 120 and 130.

FIG. 6 is a perspective view illustrating the appearance of the first and the second lens arrays 120 and 130. The first lens array 120 includes small lenses 122 which respectively have a substantially rectangular shape and are arranged in a matrix of M rows and N columns. In this example, M=10 and N=8. The second lens array 130 also includes small lenses that are arranged in a matrix of M rows and N columns corresponding to the small lenses 122 of the first lens array 120. The small lenses 122 divide the light flux emitted from the light source 110 (FIG. 5) into a plurality of (that is, M×N) partial light fluxes and condense the respective partial light fluxes in the vicinity of the second lens array 130. The contour of each small lens 122 seen from the direction z is set to be substantially similar to the shape of the liquid-crystal light valves 250, 252, and 254. In this embodiment, the aspect ratio (the ratio of the lateral dimension to the vertical dimension) of each small lens 122 is set equal to 4 to 3.

The second lens array 130 has the function of making the central optical paths of the respective partial light fluxes parallel to the system optical axis. When the light flux emitted from the light source 110 is parallel to the system optical axis, the partial light fluxes output from the small lenses 122 of the first lens array 120 have central optical paths parallel to the system optical axis, so that the second lens array 130 may be omitted. When the central optical path of the light emitted from the light source 110 has a certain angle with respect to the system optical axis, however, the central optical paths of the partial light fluxes output from the small lenses 122 are not parallel to the system optical axis. The partial light fluxes having such inclined central optical paths may not illuminate a predetermined target area, that is, target areas on the liquid-crystal light valves 250, 252, and 254. This lowers the utilization efficiency of light in the projection display apparatus. The second lens array 130 converts the partial light fluxes having central optical paths that is inclined to the system optical axis and entering the respective small lenses 132 to the partial light fluxes having central optical paths parallel to the system optical axis, thereby improving the utilization efficiency of light.

Figure 7A:
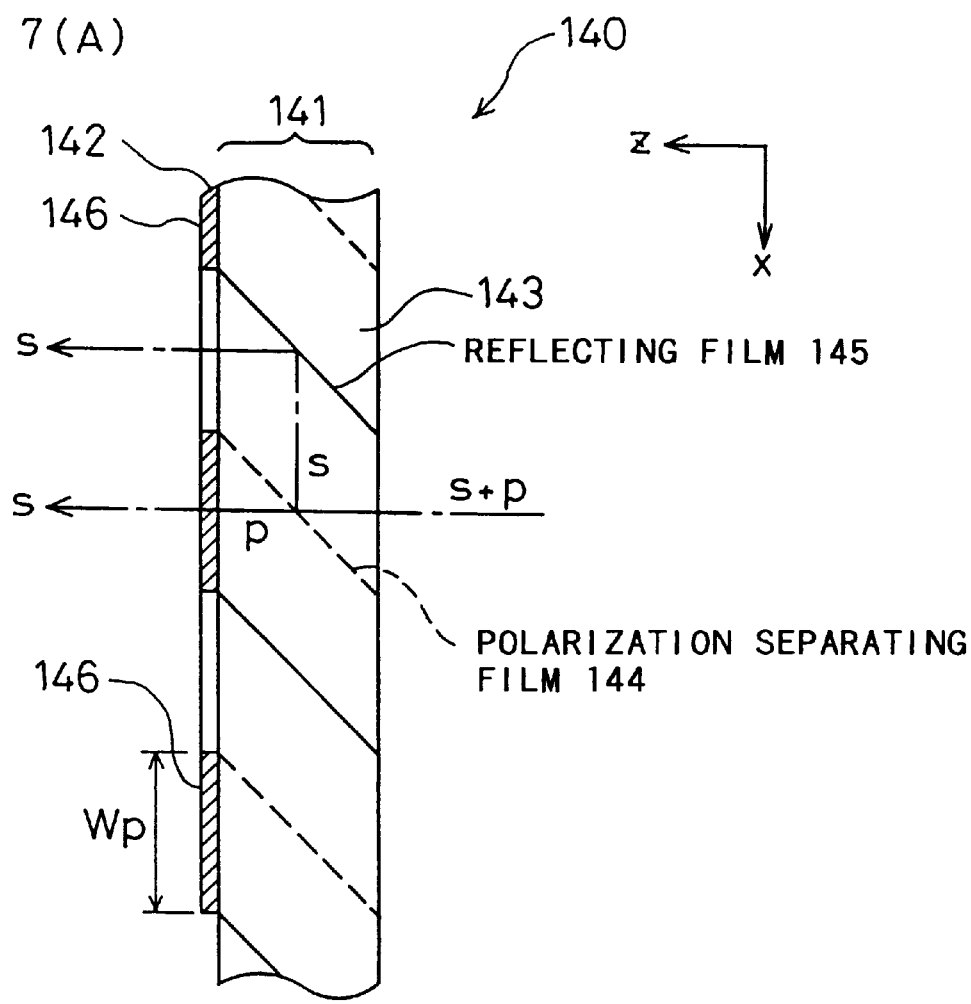
FIGS. 7(A), 7(B) show a structure of a polarizing element 140.
Figure 7B:
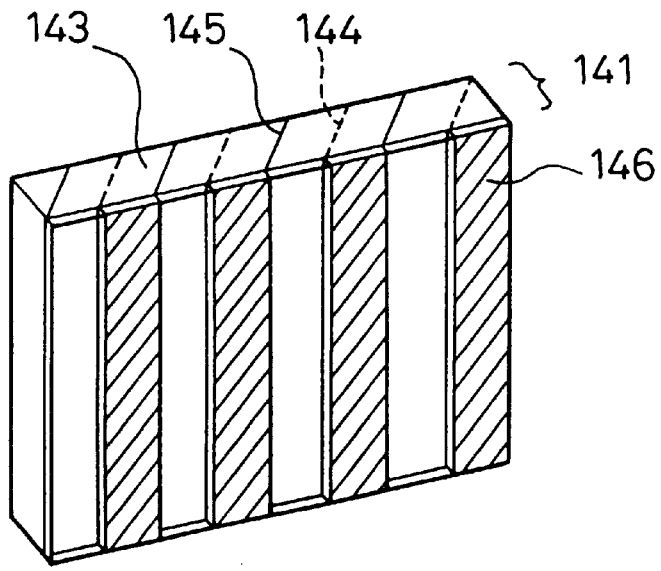

FIG. 7 illustrates structure of the polarizing element 140 (FIG. 5). The polarizing element 140 includes a polarization beam splitter array 141 and a selective phase difference plate 142. The polarization beam splitter array 141 includes a plurality of columnar transparent members 143 having a parallelogrammatic cross section, which are bonded to one another. Polarization separating films 144 and reflecting films 145 are formed alternately on the interfaces of the transparent members 143. In order to enable the polarization separating film 144 and the reflecting film 145 to be arranged alternately, the polarization beam splitter array 141 is manufactured by bonding a plurality of sheet glasses with these films formed thereon and cutting the bonded sheet glasses slantly at a predetermined angle.

The light of random polarizing directions passing through the first and the second lens arrays 120 and 130 is separated by the polarization separating film 144 into s-polarized light and p-polarized light. The s-polarized light is reflected from the polarization separating film 144 substantially at a right angle and further from the reflecting film 145 perpendicularly, whereas the p-polarized light passes through the polarization separating film 144. The selective phase difference plate 142 is an optical element having $\lambda/2$ phase difference layers 146 disposed on the light-exit surfaces of the light passing through the polarization separating films 144. There are no $\lambda/2$ phase difference layers on the light-exit surfaces of the light reflected from the reflecting films 145. The $\lambda/2$ phase difference layer 146 accordingly converts the p-polarized light transmitted by the polarization separating film 144 to s-polarized light. As a result, the light fluxes of random polarizing directions entering the polarizing element 140 are mostly converted to s-polarized light.

As clearly shown in FIG. 7(A), the position of the center of the s-polarized light emitted from one polarization separating film 144 of the polarizing element 140 (that is, the position of the center when the two rays of s-polarized light are regarded as one set of light flux) is deviated in the x direction from the center of the incident random light flux (s-polarized light+p-polarized light). The shift is equal to half a width Wp of the $\lambda/2$ phase difference layer 146 (that is, half the width of the polarization separating film 144 in the x direction). As shown in FIG. 5, the optical axis of the light source 110 (shown by the two-dot chain line) is accordingly shifted from the system optical axis (shown by the one-dot chain line) after the polarizing element 140 by a distance equal to Wp/2.

In the projection display apparatus shown in FIG. 5, the parallel light flux emitted from the light source 110 is divided into a plurality of partial light fluxes by the first and the second lens arrays 120 and 130 in the integrator optical system. The small lenses 122 of the first lens array 120 condense the respective partial light fluxes in the vicinity of the polarization separating films 144 of the polarizing element 140 (see FIG. 7). The partial light fluxes output from the polarizing element 140 are reflected from the stepped reflecting mirror 150. The structure and function of the stepped reflecting mirror 150 will be described later. The superposing lens 160 has the function of the superposing optical system that superposes and condenses the plurality of partial light fluxes on the liquid-crystal light valves 250, 252, and 254, that is, on the areas to be illuminated. This enables the respective liquid-crystal light valves 250, 252, and 254 to be illuminated in a substantially uniform manner.

The two dichroic mirrors 210 and 212 have the function of the colored light separation means that separates a ray of white light condensed by the superposing lens 160 into three colored rays of red, green, and blue. The first dichroic mirror 210 transmits a red light component of the white light flux emitted from the lighting optical system 100, while reflecting a blue light component and a green light component. The red light transmitted by the first dichroic mirror 210 is reflected from the reflecting mirror 220, passes through the field lens 240, and eventually reaches the liquid-crystal light valve 250 for red light. The field lens 240 has the function of converting the partial light fluxes output from the polarizing element 140 to light fluxes parallel to the central optical paths of the partial light fluxes. The field lenses 242 and 244 arranged before the other liquid-crystal light valves have the same function. The green light reflected from the first dichroic mirror 210 is reflected again by the second dichroic mirror 212, passes through the field lens 242, and eventually reaches the liquid-crystal light valve 252 for green light. The blue light reflected from the first dichroic mirror 210 is transmitted by the second dichroic mirror 212, passes through the relay lens system including the entrance lens 230, the relay lens 232, and the reflecting mirrors 222 and 224, goes through the field lens (exit lens) 244, and eventually reaches the liquid-crystal light valve 254 for blue light. The relay lens system is used for the blue light component which has the longer optical path than those of the other colored light components, in order to prevent a decrease in utilization efficiency of light.

Figure 18:
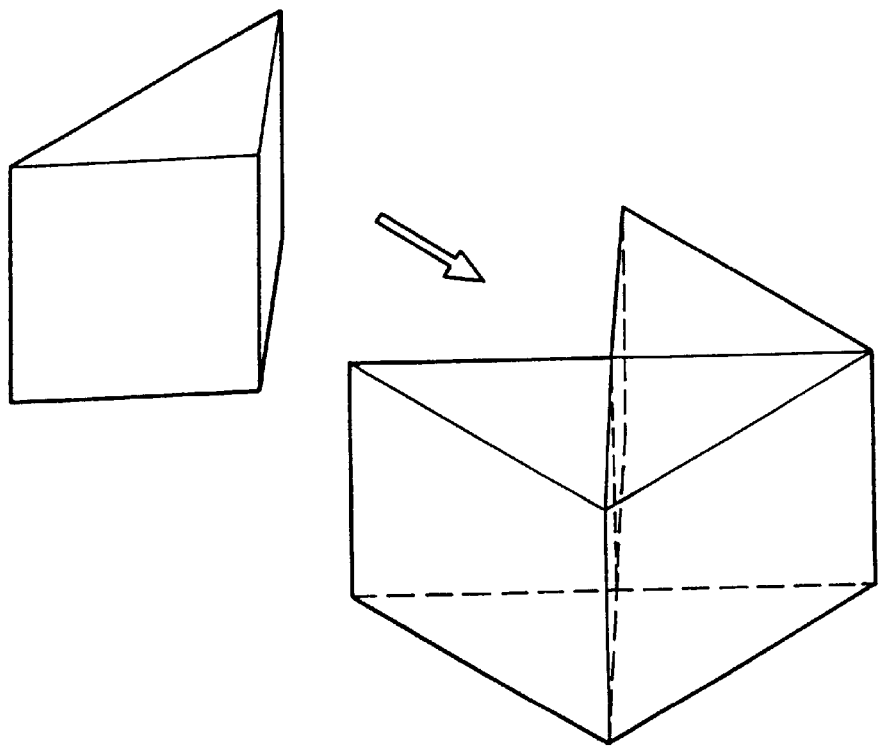
FIG. 18 is a partly decomposed perspective view illustrating a cross dichroic prism 48.
Figure 19A:
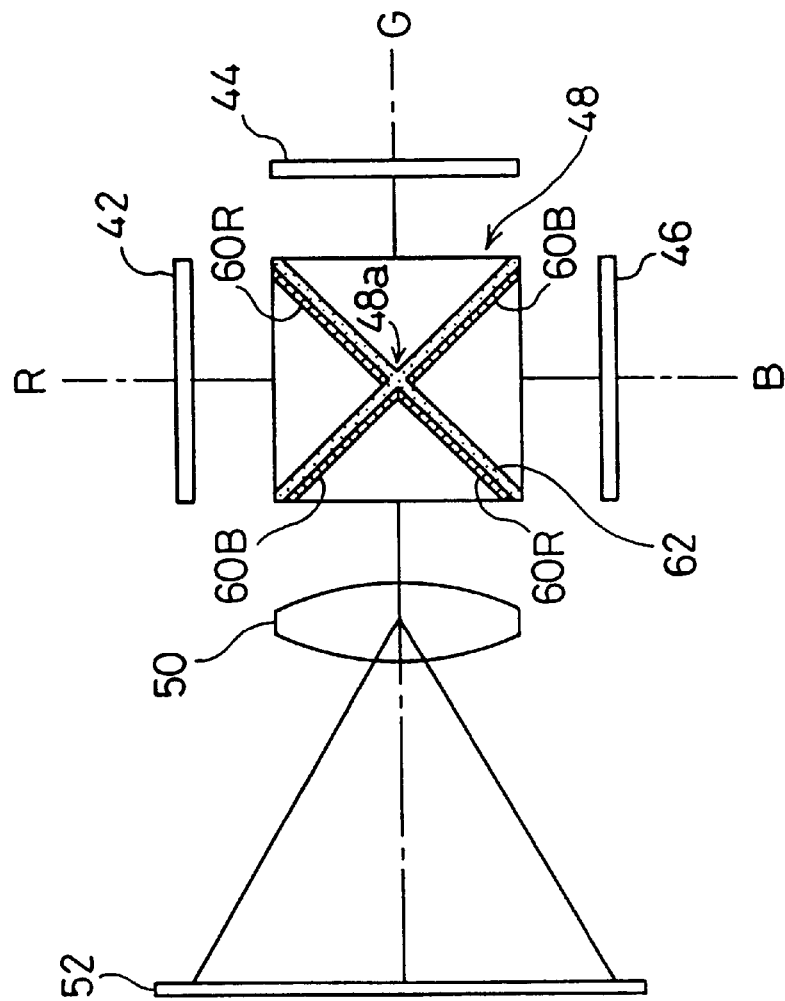
FIGS. 19(A) and 19(B) show a problem arising in the case of utilizing the cross dichroic prism 48.
Figure 19B:
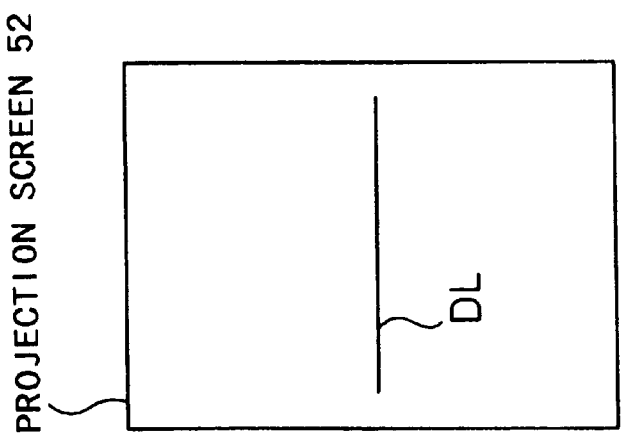

The three liquid-crystal light valves 250, 252, and 254 have the functions of the light modulation means that respectively modulate the three colored rays respective to given image information (a given image signal) to form images. The cross dichroic prism 260 has the function of the colored light combining means that combines the three colored rays and forms a color image. The structure of the dichroic prism 260 is identical with that described in FIGS. 18 and 19. The cross dichroic prism 260 has a dielectric multi-layered film for reflecting red light and another dielectric multi-layered film for reflecting blue light that are arranged in a substantially X shape on an interface of four right-angle prisms. These dielectric multi-layered films combine the three colored rays to produce composite light used for projecting a color image. The composite light generated by the cross dichroic prism 260 is output toward the projection lens system 270. The objection lens system 270 has the function of the projection optical system at projects the composite light on a projection screen 300 to display a color image.

The projection display apparatus 1000 shown in FIG. 5 is characterized by the stepped reflecting mirror 150. FIG. 8(A) is a front view and FIGS. 8(B) and (C) are plan views respectively showing the structure of the stepped reflecting mirror 150. FIGS. 8(B) and (C) are seen from the side of FIG. 8(A). The stepped reflecting mirror 150 has two long strip-like sub-mirrors 154 mounted on a plane main mirror 152. The two sub-mirrors 154 are bonded horizontally at substantially symmetrical heights from the center of the height of the main mirror 152. These mirrors may be total reflection mirrors or cold mirrors that transmit thermal energy. These mirrors may further have the function of transmitting ultraviolet rays as well as thermal energy. The stepped reflecting mirror 150 having the function of transmitting thermal energy and ultraviolet rays reduces the deterioration of polarizers and other elements generally included in the liquid-crystal light valves 250, 252, and 254 due to the heat or ultraviolet rays.

Figure 9:
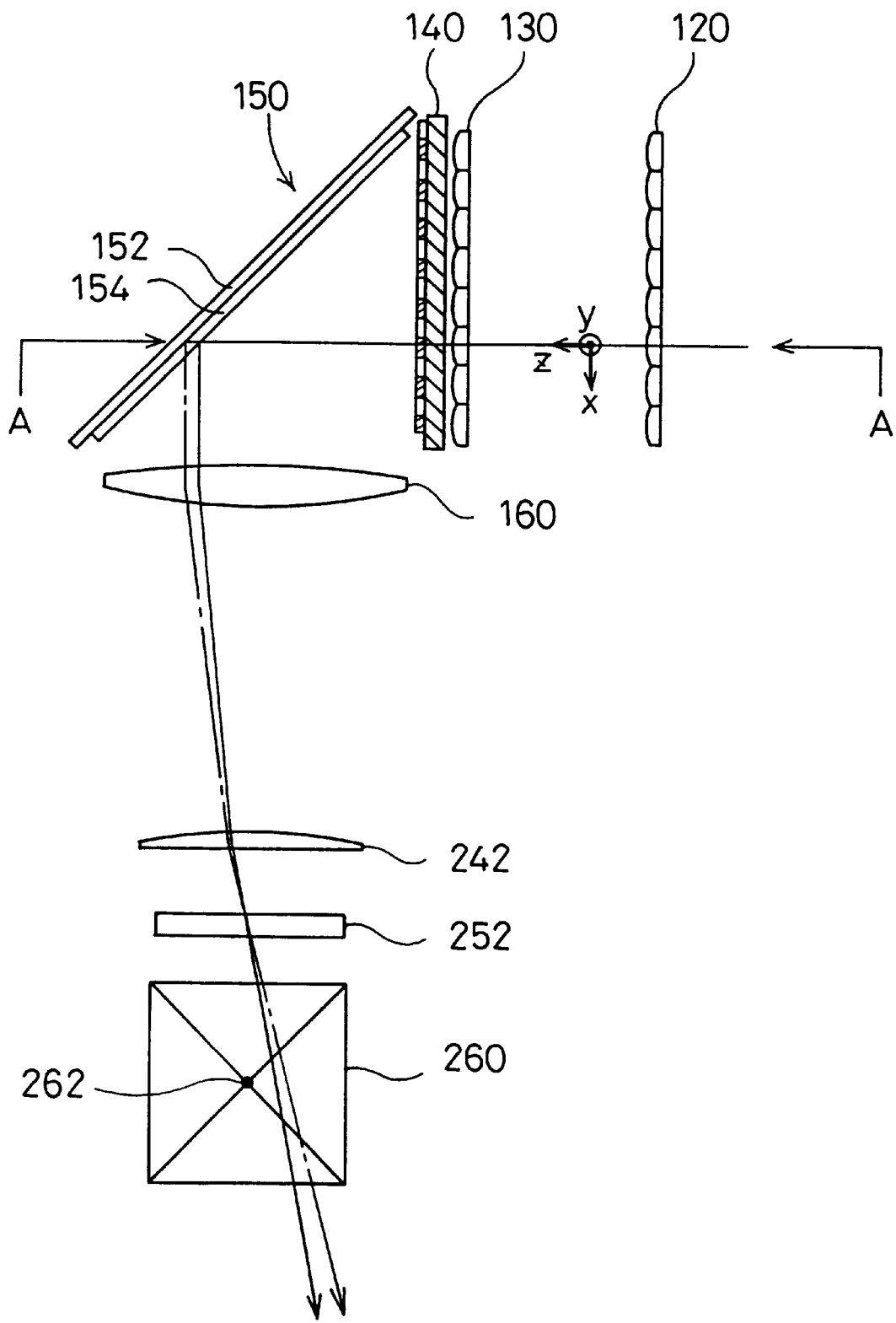
FIG. 9 shows the function of the stepped reflecting mirror 150.
Figure 10:
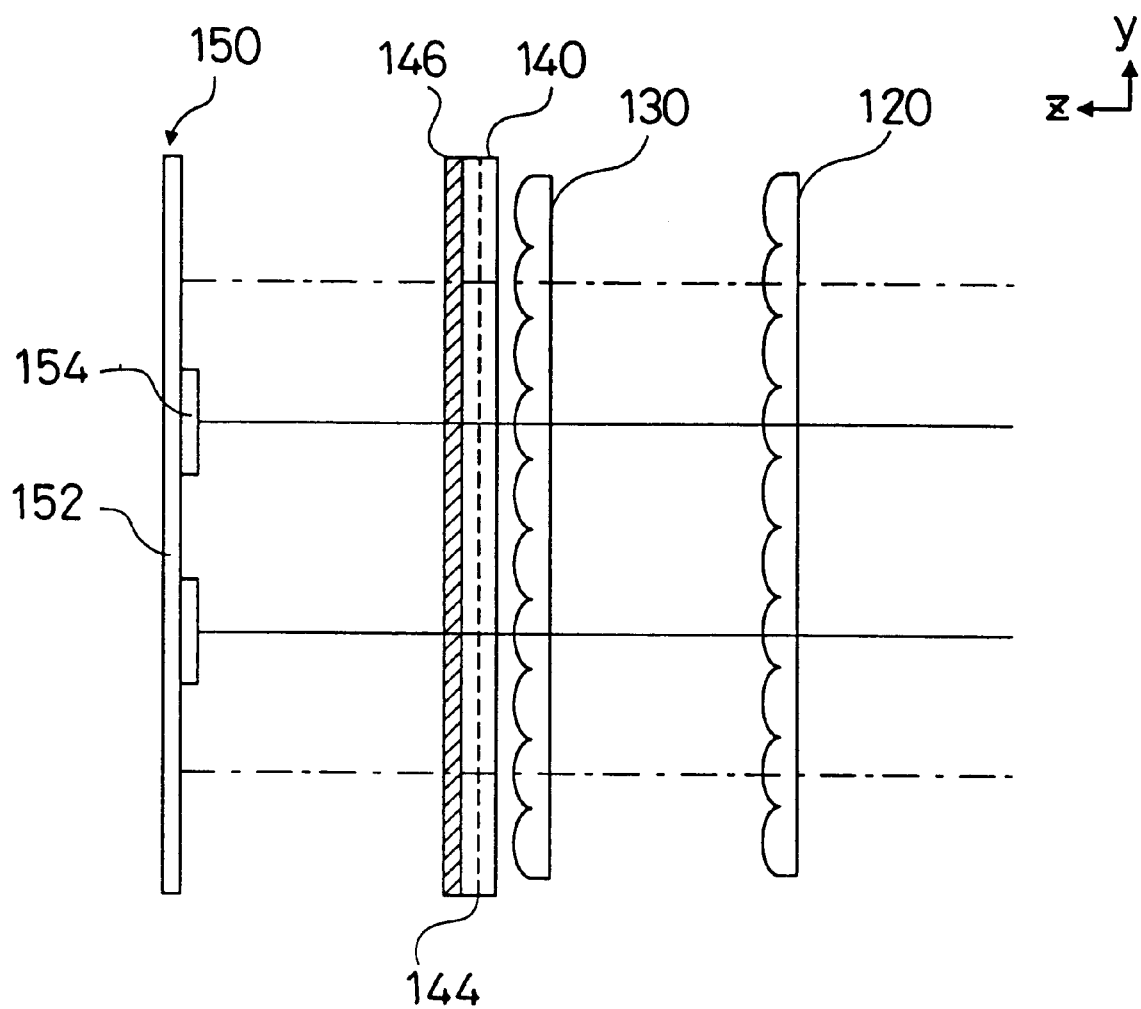
FIG. 10 shows the function of the stepped reflecting mirror 150.

FIGS. 9 and 10 show the function of the stepped reflecting mirror 150. FIG. 10 is a cross sectional view in an xy plane including the line A—A of FIG. 9. Two central optical paths are shown by the solid line and the one-dot chain line in FIGS. 9 and 10. The solid lines represents the central optical path of light reflected from the sub-mirror 154, whereas the one-dot chain line represents the central optical path of light reflected from the main mirror 152. As clearly understood from these drawings, the two optical paths of the partial light fluxes pass through the small lenses aligned on the same column (at the same position in the x direction) but existing on different rows (at the different positions in the y direction) in the lens arrays 120 and 130. As shown in FIG. 9, the optical path shown by the solid line is reflected from the stepped reflecting mirror 150 and shifted in the x direction relative to the optical path shown by the one-dot chain line.

The stepped reflecting mirror 150 shifts the central optical path of light reflected from the sub-mirror 154 shown by the solid line relative to the central optical path of light reflected from the main mirror 152 shown by the one-dot chain line. This means that the reflecting mirror 150 shifts the partial light fluxes reflected from the sub-mirror 154 from the partial light fluxes reflected from the main mirror 152 in the x direction among the partial light fluxes passing through the small lenses aligned on the same column in the lens arrays 120 and 130. This structure causes these two groups of partial light fluxes to enter the superposing lens 160 at different positions in the x direction and thereby have different incident angles on the liquid-crystal light valve 252.

The two groups of partial light fluxes entering the liquid-crystal light valve 252 at different incident angles are modulated by the liquid-crystal light valve 252 and subsequently pass through the cross dichroic prism 260. Referring to FIG. 9, the central optical path of the partial light flux reflected from the main mirror 152 and that of the partial light flux reflected from the sub-mirror 154 have different incident angles on the cross dichroic prism 260, and pass through the cross dichroic prism 260 at different positions relative to a central axis 262 of the cross dichroic prism 260. As discussed previously in the first and the second principles, when the central optical paths of the partial light fluxes pass through the cross dichroic prism 260 at different angles or when the central optical paths of the partial light fluxes are different in position relative to the central axis 262 of the cross dichroic prism 260, dark lines are formed at different positions. The structure of the embodiment accordingly prevents the dark lines formed by the respective partial light fluxes passing through the M small lenses aligned on the same column from being converged on one place, thereby making the dark lines sufficiently inconspicuous.

Figure 11:
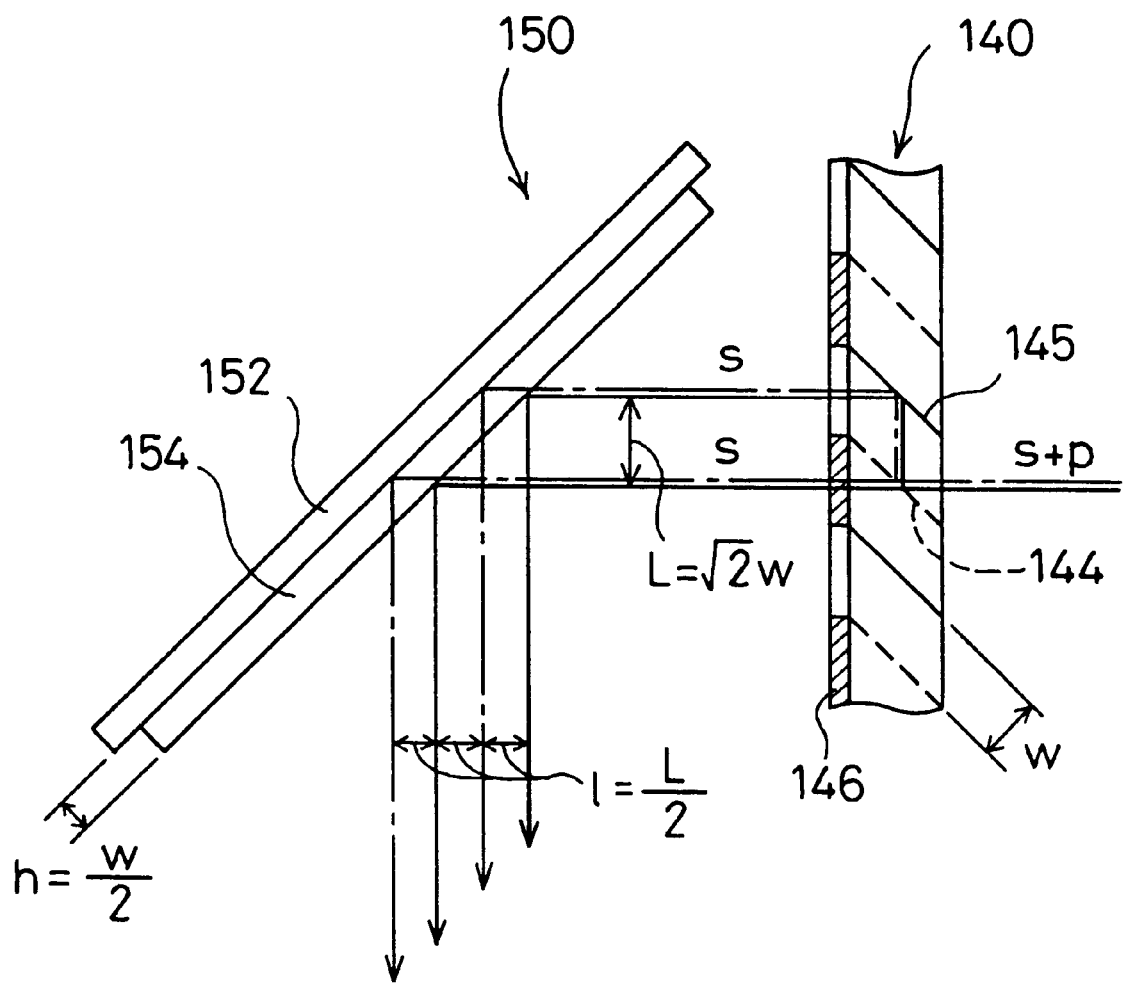
FIG. 11 is an enlarged view illustrating part of the stepped reflecting mirror 150 and the polarizing element 140 of FIG. 9.

FIG. 11 is an enlarged view showing part of the stepped reflecting mirror 150 and the polarizing element 140 of FIG. 9. The polarizing element 140 converts the incident light fluxes having random polarized light components to s-polarized light fluxes. A distance L between the central optical path of the s-polarized light flux output via the polarization separating film 144 and the $\lambda/2$ phase difference layer 146 and the central optical path of the s-polarized light flux output via the polarization separating film 144 and the reflecting film 145 is $\sqrt{2}$ times as long as a distance W between the polarization separating film 144 and the reflecting film 145. This relationship between L and W is ascribed to the fact that the polarization separating film 144 and the reflecting film 145 are inclined at 45 degrees to the light-entering surface. As clearly seen from the drawing, this relationship is common to the central optical path of the s-polarized light flux shown by the solid line and the central optical path of the s-polarized light flux shown by the one-dot chain line.

In this embodiment, a thickness h of the sub-mirror 154 is set to be half the distance W between the polarization separating film 144 and the reflecting film 145. The stepped reflecting mirror 150 is inclined at 45 degrees to the system optical axis. The central optical paths shown by the solid line and the one-dot chain line are accordingly different in position in the x direction after the light fluxes are reflected from the stepped reflecting mirror 150. Namely four central optical paths are arranged at identical intervals of the distance L/2 in the x direction.

The partial light fluxes entering the liquid-crystal light valve 252 at different incident angles are modulated by the liquid-crystal light valve 252 and subsequently passes through the cross dichroic prism 260. Referring again to FIG. 9, the four central optical paths shifted from one another by the stepped reflecting mirror 150 have different incident angles when entering the cross dichroic prism 260, and pass through the cross dichroic prism 260 at different positions relative to the central axis 262 of the cross dichroic prism 260. As discussed previously in the first and the second principles, when the central optical paths of the partial light fluxes have different incident angles and pass through the cross dichroic prism 260 at different angles or when the central optical paths of the partial light fluxes are different in position relative to the central axis 262 of the cross dichroic prism 260, dark lines are formed at different positions. The structure of the embodiment accordingly prevents the dark lines formed by the respective partial light fluxes passing through the M small lenses arranged on the same direction of columns from being converged on one place, thereby making the dark lines sufficiently inconspicuous.

As clearly understood from the description regarding FIG. 9, although application of the stepped reflecting mirror 150 to the lighting optical system including the integrator optical system makes the darks lines inconspicuous, use of the polarizing element makes the dark lines more inconspicuous. This is ascribed to the following reason. Application of the stepped reflecting mirror 150 to the lighting optical system including the integrator optical system causes the central optical paths of the partial light fluxes passing through the small lenses aligned on the same column (at the same position in the x direction) in the lens arrays 120 and 130 to be shifted to two different positions in the x direction, thereby separating the dark lines into two different places. The polarizing element causes the central optical paths of the partial light fluxes passing through the small lenses aligned on the same column (at the same position in the x direction) in the lens arrays 120 and 130 to be shifted to four different positions in the x direction, thereby separating the dark lines into four different places.

The thickness h of the sub-mirrors 154 is set to cause a distance l to be different from the distance L where the distance l is between the central optical path of the partial light flux deviated in the z direction by the stepped reflecting mirror 150 and the central optical path of the partial light flux not deviated in the z direction among the partial light fluxes passing through the small lenses existing on the same column while the distance L is between the central optical path of the s-polarized light flux output from the polarization separating film 144 and the $\lambda/2$ phase difference layer 146 and the central optical path of the s-polarized light flux output from the polarization separating film 144 and the reflecting film 145. Especially when the thickness h is set to satisfy l=L/2 as shown in FIG. 11, the separate positions of the dark lines projected on the screen have the maximum distance, so that the dark lines are made most inconspicuous.

The position and the width of the two sub-mirrors 154 in the direction of height shown in FIG. 8 are determined so that the sub-mirrors 154 is located at the position where the light flux emitted from the light source 110 has the large intensity of light. The intensity of light of the partial light flux passing through the small lens existing within a focal distance f of the concave mirror 114 from the center of the height of the lens arrays 120 and 130 is greater than the intensities of light of the partial light fluxes passing through the small lenses at the other heights. It is accordingly effective that the sub-mirrors 154 of the stepped reflecting mirror 150 are set to shift the optical axis of light passing through the area which the partial light flux having the greater intensity of light is reflected from. The width of the sub-mirrors 154 (the dimension in the direction of height) may be set greater than that shown in FIG. 8. The dark lines on the projection screen are conspicuous when the quantity of light of the dark lines becomes equal to or less than approximately 95% of the quantity of light of the other part. The dark lines having the quantity of light over the range of approximately 98 to 97% are not significantly conspicuous. It is thus preferable that the width of the sub-mirrors 154 is adjusted to cause the quantity of light of the dark lines formed by projecting the central axis of the cross dichroic prism 260 to be not less than approximately 98% of the quantity of light of the other part.

The stepped reflecting mirror 150 shown in FIG. 8 has the two-step structure including the main mirror 152 and the sub-mirrors 154. A multi-stepped reflecting mirror of three- or more-step structure may also be applicable.

B. Second Embodiment

Figure 12:
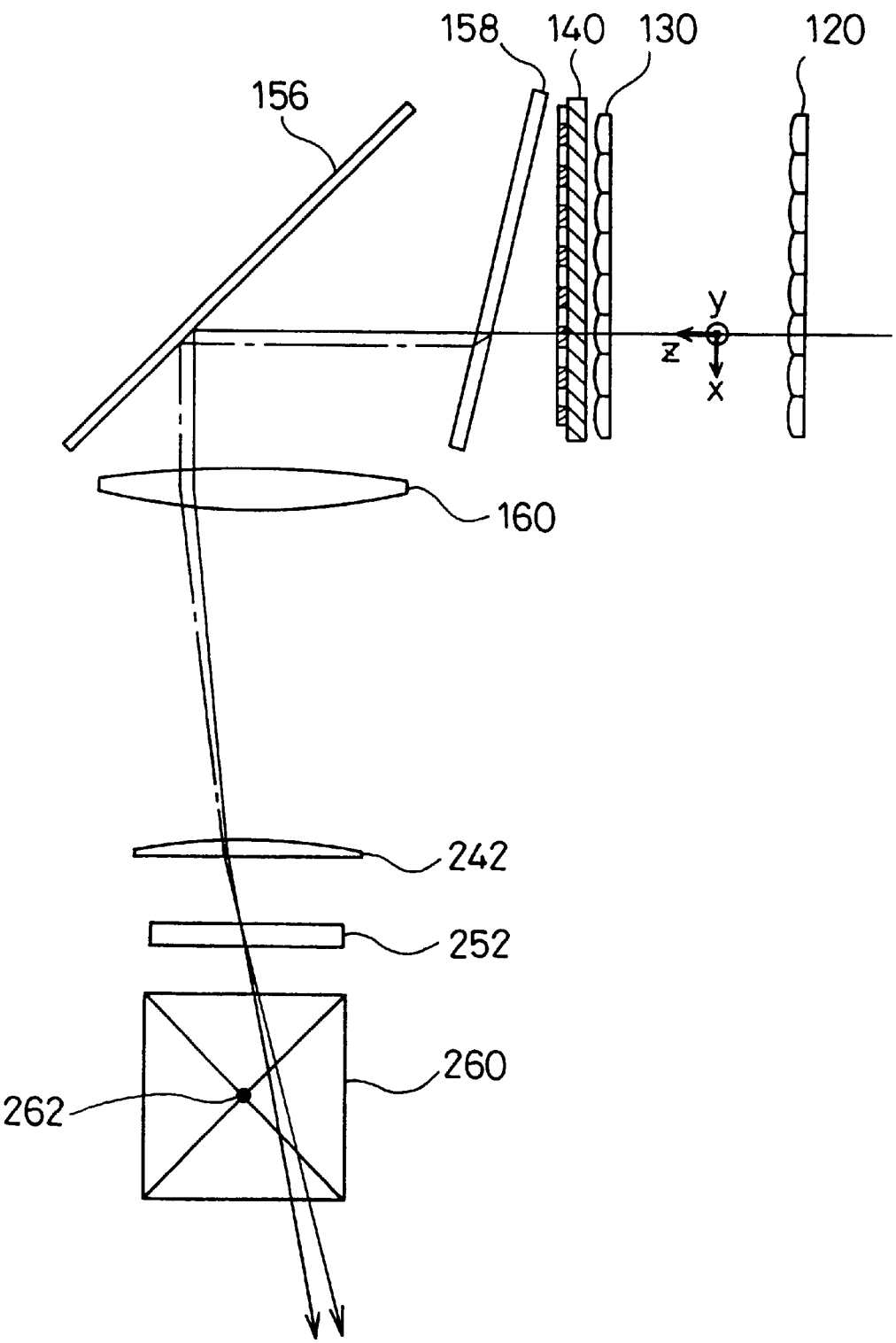
FIG. 12 illustrates a main part of a projection display apparatus 2000 and its lighting optical system as a second embodiment according to the present invention.

FIG. 12 shows a main part of a projection display apparatus 2000 and its lighting optical system as a second embodiment according to the present invention. FIG. 12 corresponds to FIG. 9 of the first embodiment. The second embodiment uses a conventional flat reflecting mirror 156 instead of the stepped reflecting mirror 150 of the first embodiment and includes planar transparent members 158 interposed between the polarizing element 140 and the reflecting mirror 156. The other constituents of the second embodiment are identical with those of the projection display apparatus 1000 of the first embodiment. The transparent members 158 can be disposed at any place between the second lens array 130 and the superposing lens 160, for example, between the reflecting mirror 156 and the superposing lens 160.

Two transparent members 158 are disposed at the height corresponding to the two sub-mirrors 154 shown in FIG. 8. The dimension of the transparent members 158 in the direction of height is substantially equal to that of the sub-mirrors 154 (FIG. 8) discussed in the first embodiment. The central axis 262 of the cross dichroic prism 260 extends in the direction perpendicular to the sheet surface of FIG. 12. The transparent members 158 are set rotated about the direction corresponding to the central axis 262 of the cross dichroic prism 260 and inclined from the plane of the lens arrays 120 and 130. The transparent members 158 may be sheet glass or sheet-like optical glass.

As is known, the planar transparent members 158 have the function of shifting the optical paths of the rays slantly entering to substantially parallel positions. The two transparent members 158 are set respectively at the positions corresponding to the two sub-mirrors 154. The optical path of the ray passing through the transparent member 158 is shifted in parallel as shown by the one-dot chain line in FIG. 12. The ray shown by the solid line, on the other hand, does not pass through the transparent member 158 and keeps the optical path unchanged.

Both the stepped reflecting mirror 150 of the first embodiment and the transparent members 158 of the second embodiment have the function of the optical path shifting means that shifts the optical path of part of partial light fluxes among a plurality of partial light fluxes passing through the same column in the lens arrays 120 and 130 from the optical path of the other partial light fluxes. These elements and the superposing lens 160 have the function of the optical path angle changing means that causes the incident angle of the optical path of part of the partial light fluxes entering the cross dichroic prism 260 among a plurality of partial light fluxes passing through the same column in the lens arrays 120 and 130 to be different from the incident angle of the optical path of the other partial light fluxes. The shift of the optical path by the optical path shifting means is set at least to be different from the distance between the two linear polarized light components separated by the polarizing element 140. In the second embodiment the shift amount of the optical path can be regulated by adjustment of the refractive index, the angle of inclination, and the thickness of the transparent members 158.

Elements other than the stepped reflecting mirror and the transparent members may be used as the optical path shifting means. Different types of elements may be used in combination as the optical path shifting means.

C. Third Embodiment

FIG. 13 is a front view showing the comparison between the lens arrays 120 and 130 of the first embodiment and lens arrays 124 and 134 used in a projection display apparatus 3000 of a third embodiment. The third embodiment uses these lens arrays 124 and 134 and includes a conventional flat reflecting mirror instead of the stepped reflecting mirror 150. The projection display apparatus 3000 of the third embodiment has the same structure as that of the projection display apparatus 1000 of the first embodiment, except these elements and a modification of the polarizing element discussed later.

As shown in FIG. 13(B), in the lens arrays 124 and 134 of the third embodiment, small lenses on the fourth row and the seventh row among ten rows of small lenses are respectively shifted rightward and leftward from the other rows. The small lenses on the fourth row are shifted rightward by an amount of deviation d from the other rows, whereas the small lenses on the seventh row are shifted leftward by the amount of deviation d from the other rows.

Figure 14:
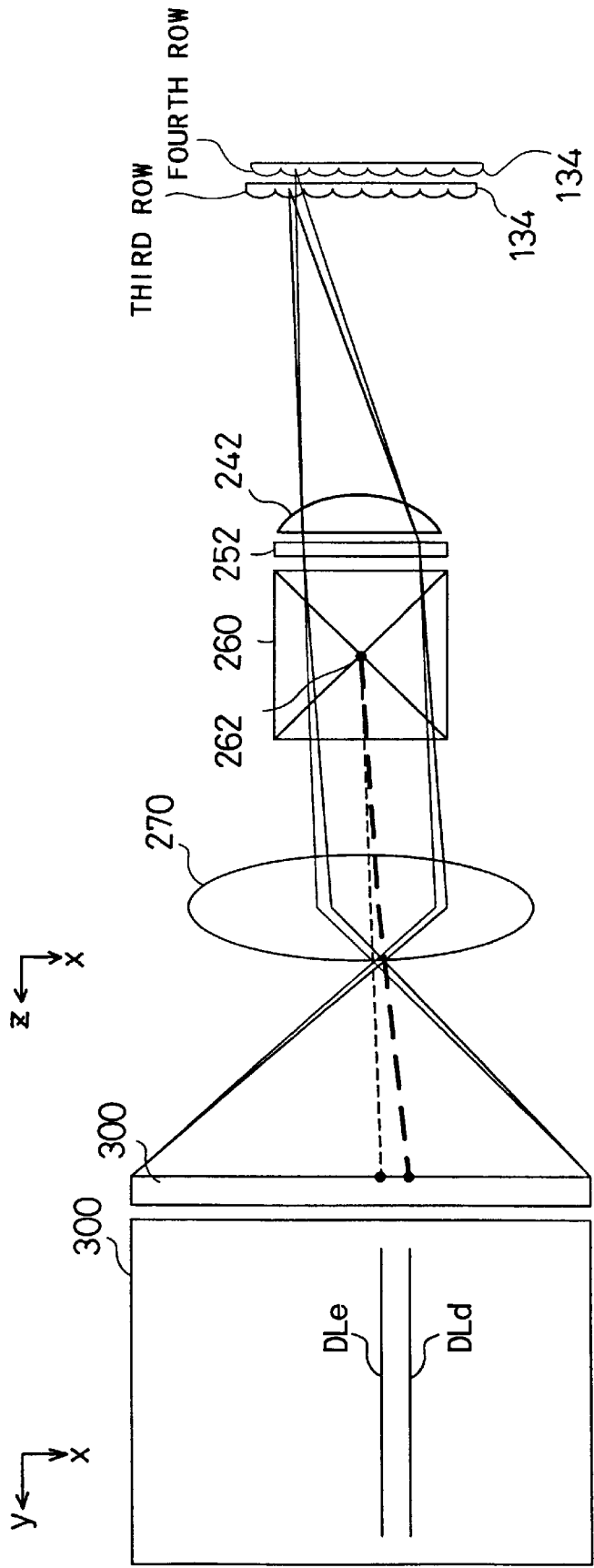
FIG. 14 shows the state in which partial light fluxes passing through the small lenses are transmitted by a cross dichroic prism 260.
Figure 17:
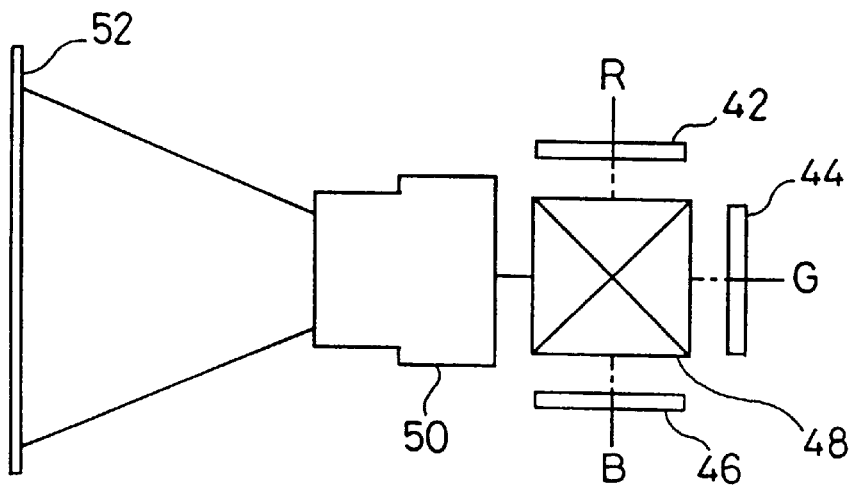
FIG. 17 conceptually illustrates a main part of a projection display apparatus.

The fourth row and the seventh row respectively are located at positions apart from the center of the lens arrays in the direction of height by the focal distance f of the concave mirror 114. As discussed previously, the partial light flux passing through this height has the greater intensity of light than those of the partial light fluxes passing through the other heights. Shifting the small lenses on these rows rightward or leftward varies the incident angle of the partial light fluxes that enter the cross dichroic prism 260 after passing through these small lenses. This state is described in detail with FIG. 14. In the drawing of FIG. 14, part of the constituents (for example, a polarizing element 148 discussed later) of the projection display apparatus 3000 of this embodiment are omitted for the clarity of explanation. Only the third row and the fourth row in the second lens array 134 are illustrated in FIG. 14. As clearly seen from FIG. 14, the partial light fluxes passing through the small lenses on these rows pass through the cross dichroic prism 260 at different angles, and cause dark lines DLd and DLe to be formed at different positions. This structure accordingly diverges the positions of the darks lines formed on the projection screen 300 and makes the dark lines sufficiently inconspicuous. This result is based on the second principle discussed previously.

It is preferable that the amount of deviation d of the small lenses on the fourth row and the seventh row is set to be approximately one third of a width P of each small lens. This causes the small lenses on the fourth row to be shifted from the small lenses on the seventh row and separates the positions of the dark lines formed on the projection screen, thereby making the dark lines sufficiently inconspicuous.

FIG. 15 shows the comparison between the polarizing element 140 used in the first embodiment and that applicable in the third embodiment. FIG. 15(A) is a plan view illustrating the second lens array 130 and the polarizing element 140 of the first embodiment, and FIG. 15(B) is a front view illustrating the polarizing element 140 of the first embodiment. Referring to these drawings, the polarization beam splitter array 141 and the selective phase difference plate 142 of the polarizing element 140 are arranged in such a manner that the constituents thereof (transparent members and $\lambda/2$ phase difference plates) extend in the vertical direction seen from the front.

If the lens arrays 124 and 134 shown in FIG. 13(B) are used, a polarizing element shown in either FIG. 15(C) or FIG. 15(D) is applicable. A polarizing element 148 shown in FIG. 15(C) has a polarization beam splitter array and a selective phase difference plate that are shifted by an amount of the deviation d at the positions corresponding to the shifted rows in the lens arrays 124 and 134. A polarizing element 149 shown in FIG. 15(D), on the other hand, has a polarization beam splitter array and a selective phase difference plate that are arranged to extend in the horizontal direction seen from the front. The arrangement extending in the horizontal direction as shown in FIG. 15(D) enables the same polarizing element to be applied even when the amount of deviation d of the rows in the lens array is varied. For that purpose, a sufficiently large width is required for the polarizing element of FIG. 15(D).

D. Fourth Embodiment

FIG. 16 is a front view showing the comparison between the lens arrays 120 and 130 of the first embodiment and lens arrays 126 and 136 used in a fourth embodiment. The fourth embodiment has the same structure as that of the third embodiment, except that these lens arrays 126 and 136 and a polarizing element suitable for the lens arrays are used in the fourth embodiment. The polarizing element applicable in the fourth embodiment may be similar to that of the third embodiment shown in FIG. 15 and is thus not specifically described here.

Referring to FIG. 16(B), in the lens arrays 126 and 136 of the fourth embodiment, the respective rows of small lenses are shifted in a successive manner. The first, the fourth, the seventh, and the tenth rows are arranged at an identical position, whereas the second, the fifth, and the eighth rows and the third, the sixth, and the ninth rows are arranged respectively at identical positions. When the position of the first row is defined as the reference position, the second, the fifth, and the eighth rows are shifted rightward from the first row by an amount of deviation d. The third, the sixth, and the ninth rows are, on the other hand, shifted leftward from the first row by the amount of deviation d.

It is preferable that the amount of deviation d is set to be approximately one third of the width P of each small lens. This causes only two fifths of ten rows to be overlapped in the vertical direction (that is, in the direction of columns). As discussed previously, a plurality of small lenses aligned on the same column project the central axis of the cross dichroic prism 260 at the same position on the projection screen to form a dark line. Shifting the rows of the lens array rightward or leftward to reduce the number of rows overlapping on the same column in the lens array to be not greater than approximately two fifths makes the dark lines formed on the projection screen 300 sufficiently inconspicuous.

It is more preferable that the amount of deviation d is set to be approximately one quarter of the width P of each small lens. In general, it is preferable that the respective rows are shifted leftward or rightward by the amount of deviation d in the range of approximately one third to one fifth of the width P of each small lens.

Some variations in the two lens arrays and the polarizing element like the third and the fourth embodiments enable the dark lines formed by projecting the central axis of the cross dichroic prism 260 on the projection screen 300 to be sufficiently inconspicuous.

The invention of making the dark lines inconspicuous is not restricted to the above embodiments or modes, but there may be many modifications, changes, and alterations without departing from the scope or spirit of the main characteristics of the present invention.

The projection display apparatus of the present invention includes: a lighting optical system which emits light; three light modulation means which respectively modulate three colored rays based on given image signals; colored light combining means which has two dichroic films arranged in an X shape and a central axis corresponding to a position where the two dichroic films cross each other, where the colored light combining means combines the three colored rays respectively modulated by the three light modulation means and outputs the composite light in a common direction; and projection means which projects the composite light output from the colored light combining means on a projection surface. The lighting optical system includes a dividing and superposing optical system that divides a light flux at least in a predetermined direction corresponding to the central axis of the colored light combining means into a plurality of partial light fluxes of at least one column and superposes the plurality of partial light fluxes on each light modulation means. The dividing and superposing optical system is constructed to shift a position where the central axis of the colored light combining means is projected on the projection surface by part of the partial light fluxes among the plurality of partial light fluxes on one column, from a position where the central axis is projected by the other partial light fluxes in a direction different from that corresponding to the central axis of the colored light combining means. This structure causes part of the partial light fluxes among the plurality of partial light fluxes arranged on one column to project the central axis of the colored light combining means as a dark line at a different position on the projection surface from the position of a dark line formed by the other partial light fluxes, thus making the dark lines formed on the projected image sufficiently inconspicuous.

In the above embodiments, the polarizing element is used to convert the incident light flux to one linear polarized light component. The polarizing element may, however, be omitted. Even in this case, the effect of making the dark lines formed on the projection screen inconspicuous can be attained in the respective embodiments discussed above.

All the above embodiments regard the transmission-type projection display apparatuses. The present invention is, however, also applicable to reflection-type projection display apparatuses. The 'transmission-type' implies that the light modulation means, such as the liquid-crystal light valve, transmits light, whereas the 'reflection-type' implies that the light modulation means reflects light. In the reflection-type projection display apparatus, the cross dichroic prism is used both as the colored light separation means which separates white light into three colored rays of red, green, and blue and as the colored light combining means which recombines the modulated three colored rays and emits the composite light in a predetermined direction. The reflection-type projection display apparatus to which the present invention is applied has similar effects to those of the transmission-type projection display apparatus.

The lighting optical system of the present invention is applicable to a variety of projection display apparatuses. The projection display apparatus of the present invention may be used to project and display images output from a computer or images output from a video cassette recorder on a screen.

What is claimed is:

1. A projection display apparatus, comprising:

a lighting optical system which emits light;

colored light separation means which separates the light into three colored rays;

three light modulation means which respectively modulate the three colored rays based on given image signals;

colored light combining means which has two dichroic films arranged in an X shape and a central axis corresponding to a position where the two dichroic films cross each other, the colored light combining means combining the three colored rays respectively modulated by the three light modulation means to composite light and outputting the composite light in a common direction; and projection means which projects the composite light output from the colored light combining means on a projection surface, wherein the lighting optical system comprises a dividing and superposing optical system that divides a light flux into a plurality of partial light fluxes, which are arranged in a direction of columns substantially parallel to the central axis of the colored light combining means and in a direction of rows substantially perpendicular to the central axis of the colored light combining means, and superposes the plurality of partial light fluxes, and wherein the dividing and superposing optical system is constructed to shift a position where the central axis is projected on the projection surface by part of the partial light fluxes among the partial light fluxes on an identical column from a position where the central axis is projected by the other partial light fluxes on the identical column, the positional shift being in a direction different from a direction corresponding to the central axis.

2. A projection display apparatus in accordance with claim 1, wherein the dividing and superposing optical system comprises:

light flux dividing means which divides the light flux into the plurality of partial light fluxes; and incident angle changing means that causes the part of the partial light fluxes among the partial light fluxes on the identical column to enter the colored light combining means at an incident angle different from that of the other partial light fluxes.

3. A projection display apparatus in accordance with claim 2, wherein the light flux dividing means comprises at least one lens array having a plurality of small lenses arranged in the directions of columns and rows, and the incident angle changing means comprises a stepped reflecting mirror having a step part on a reflecting surface thereof.

4. A projection display apparatus in accordance with claim 2, wherein the light flux dividing means comprises at least one lens array having a plurality of small lenses arranged in the directions of columns and rows, and the incident angle changing means comprises a transparent member arranged to be inclined relative to a surface of the lens array.

5. A projection display apparatus, comprising:

a lighting optical system which emits light;

colored light separation means which separates the light into three colored rays;

three light modulation means which respectively modulate the three colored rays based on given image signals;

colored light combining means which has two dichroic films arranged in an X shape and a central axis corresponding to a position where the two dichroic films cross each other, the colored light combining means combining the three colored rays respectively modulated by the three light modulation means to composite light and outputting the composite light in a common direction; and projection means which projects the composite light output from the colored light combining means on a projection surface, wherein the lighting optical system comprises:

a first lens array having a plurality of small lenses that divide a light flux emitted from a light source into a plurality of partial light fluxes;

a second lens array having a plurality of small lenses that respectively correspond to the plurality of small lenses of the first lens array; and optical path shifting means which shifts an optical path of part of the partial light fluxes among a plurality of partial light fluxes passing through the plurality of small lenses arranged in a predetermined direction corresponding to the central axis of the colored light combining means from an optical path of the other partial light fluxes among the plurality of partial light fluxes.

6. A projection display apparatus in accordance with claim 5, wherein the optical path shifting means comprises:

means which shifts the optical path of the partial light fluxes passing through positions respectively apart from an optical axis of the light source by a specified distance in the predetermined direction from the optical path of the partial light fluxes passing through the other positions.

7. A projection display apparatus in accordance with claim 6, wherein the light source comprises a light-source lamp and a concave mirror that reflects light emitted from the light-source lamp, and the specified distance is substantially equal to a focal distance of the concave mirror.

8. A projection display apparatus in accordance with claim 5, wherein the optical path shifting means comprises a stepped reflecting mirror having a step part on a reflecting surface thereof.

9. A projection display apparatus in accordance with claim 8, wherein the step part of the stepped reflecting mirror is arranged to extend in a direction perpendicular to the predetermined direction.

10. A projection display apparatus in accordance with claim 8, wherein the stepped reflecting mirror has a first reflecting surface and a second reflecting surface of different heights, the second reflecting surface being arranged at two different positions respectively apart from an optical axis of the light source by a specified distance in the predetermined direction corresponding to the central axis of the colored light combining means.

11. A projection display apparatus in accordance with claim 5, wherein the optical path shifting means comprises a transparent member arranged to be inclined relative to a surface of the second lens array.

12. A projection display apparatus in accordance with claim 5, wherein the lighting optical system further comprises:

a polarizing element disposed at a position between the second lens array and the optical path shifting means, wherein the polarizing element comprises:

a polarization beam splitter array which has plural sets of a polarization separating film and a reflecting film that are parallel to each other, the polarization beam splitter array separating each of the plurality of partial light fluxes passing through the plurality of small lenses of the second lens array into two types of linear polarized light components; and a polarizer which equalizes polarizing directions of the two types of linear polarized light components separated by the polarization beam splitter array, and wherein the optical path shifting means shifts part of optical paths of the two types of linear polarized light components, which pass through the plurality of small lenses arranged in the predetermined direction corresponding to the central axis of the colored light combining means and are separated by the polarization beam splitter array, from the other optical paths.

13. A projection display apparatus in accordance with claim 12, wherein an amount of shift by which the part of the optical paths of the two types of linear polarized light components are shifted from the other optical paths by the optical path shifting means is approximately half a distance between adjoining optical paths of the two types of linear polarized light components.

14. A projection display apparatus in accordance with claim 5, the projection display apparatus further comprising:

a superposing optical system which superposes a plurality of partial light fluxes passing through the first lens array and the second lens array to illuminate the three light modulation means, wherein the optical path shifting means is disposed between the second lens array and the superposing optical system.

15. A projection display apparatus, comprising:

a lighting optical system which emits light;

colored light separation means which separates the light into three colored rays;

three light modulation means which respectively modulate the three colored rays based on given image signals;

colored light combining means which has two dichroic films arranged in an X shape and a central axis corresponding to a position where the two dichroic films cross each other, the colored light combining means combining the three colored rays respectively modulated by the three light modulation means to composite light and outputting the composite light in a common direction; and projection means which projects the composite light output from the colored light combining means on a projection surface, wherein the lighting optical system comprises:

a first lens array having a plurality of small lenses that divide a light flux emitted from a light source into a plurality of partial light fluxes; and a second lens array having a plurality of small lenses that respectively correspond to the plurality of small lenses of the first lens array, each of the first lens array and the second lens array being divided in a direction of rows perpendicular to a direction corresponding to the central axis of the colored light combining means into a plurality of rows each having a plurality of small lenses, wherein rows located respectively apart from an optical path of the light source by a specified distance in the direction corresponding to the central axis of the colored light combining means are arranged at positions shifted from the other rows by a fixed amount of shift.

16. A projection display apparatus in accordance with claim 15, wherein the light source comprises a light-source lamp and a concave mirror that reflects light emitted from the light-source lamp, and the specified distance is substantially equal to a focal distance of the concave mirror.

17. A projection display apparatus, comprising:

a lighting optical system which emits light;

colored light separation means which separates the light into three colored rays;

three light modulation means which respectively modulate the three colored rays based on given image signals;

colored light combining means which has two dichroic films arranged in an X shape and a central axis corresponding to a position where the two dichroic films cross each other, the colored light combining means combining the three colored rays respectively modulated by the three light modulation means to composite light and outputting the composite light in a common direction; and projection means which projects the composite light output from the colored light combining means on a projection surface, wherein the lighting optical system comprises:

a first lens array having a plurality of small lenses that divide a light flux emitted from a light source into a plurality of partial light fluxes; and a second lens array having a plurality of small lenses that respectively correspond to the plurality of small lenses of the first lens array, each of the first lens array and the second lens array being divided in a direction of rows perpendicular to a direction corresponding to the central axis of the colored light combining means into a plurality of rows each having a plurality of small lenses, wherein at least part of the rows among the plurality of rows are arranged at a position shifted from the other rows, and a number of rows whose small lenses are arranged at identical positions in a direction perpendicular to the direction of rows is set to be not greater than two fifths of a total number of the plurality of rows.

18. A projection display apparatus in accordance with claim 17, wherein the plurality of rows in the first lens array and the second lens array are shifted from one another by a fixed amount of shift.

19. A lighting optical system for emitting light for use in a projection display apparatus comprising: colored light separation means which separates the light into three colored rays; three light modulation means which respectively modulate the three colored rays based on given image signals; colored light combining means which has two dichroic films arranged in an X shape and a central axis corresponding to a position where the two dichroic films cross each other, the colored light combining means combining the three colored rays respectively modulated by the three light modulation means to composite light and outputting the composite light in a common direction; and projection means which projects the composite light output from the colored light combining means on a projection surface, the lighting optical system comprising:

a dividing and superposing optical system that divides a light flux into a plurality of partial light fluxes, which are arranged in a direction of columns substantially parallel to the central axis of the colored light combining means and in a direction of rows substantially perpendicular to the central axis of the colored light combining means, and superposes the plurality of partial light fluxes, wherein the dividing and superposing optical system is constructed to shift a position where the central axis is projected on the projection surface by part of the partial light fluxes among the partial light fluxes on an identical column from a position where the central axis is projected by the other partial light fluxes on the identical column, the positional shift being in a direction different from a direction corresponding to the central axis.

20. A lighting optical system in accordance with claim 19, wherein the dividing and superposing optical system comprises:

light flux dividing means which divides the light flux into the plurality of partial light fluxes; and incident angle changing means that causes the part of the partial light fluxes among the partial light fluxes on the identical column to enter the colored light combining means at an incident angle different from that of the other partial light fluxes.

21. A lighting optical system in accordance with claim 20, wherein the light flux dividing means comprises at least one lens array having a plurality of small lenses arranged in the directions of columns and rows, and the incident angle changing means comprises a stepped reflecting mirror having a step part on a reflecting surface thereof.

22. A lighting optical system in accordance with claim 20, wherein the light flux dividing means comprises at least one lens array having a plurality of small lenses arranged in the directions of columns and rows, and the incident angle changing means comprises a transparent member arranged to be inclined relative to a surface of the lens array.

23. A lighting optical system that emits light, the lighting optical system comprising:

a first lens array having a plurality of small lenses that divide a light flux emitted from a light source into a plurality of partial light fluxes;

a second lens array having a plurality of small lenses that respectively correspond to the plurality of small lenses of the first lens array; and optical path shifting means which shifts an optical path of part of the partial light fluxes among a plurality of partial light fluxes passing through the plurality of small lenses arranged in a predetermined direction from an optical path of the other partial light fluxes among the plurality of partial light fluxes.

24. A lighting optical system in accordance with claim 23, wherein the optical path shifting means comprises:

means which shifts the optical path of the partial light fluxes passing through positions respectively apart from an optical axis of the light source by a specified distance in the predetermined direction from the optical path of the partial light fluxes passing through the other positions.

25. A lighting optical system in accordance with claim 24, wherein the light source comprises a light-source lamp and a concave mirror that reflects light emitted from the light-source lamp, and the specified distance is substantially equal to a focal distance of the concave mirror.

26. A lighting optical system in accordance with claim 23, wherein the optical path shifting means comprises a stepped reflecting mirror having a step part on a reflecting surface thereof.

27. A lighting optical system in accordance with claim 26, wherein the step part of the stepped reflecting mirror is arranged to extend in a direction perpendicular to the predetermined direction.

28. A lighting optical system in accordance with claim 26, wherein the stepped reflecting mirror has a first reflecting surface and a second reflecting surface of different heights, the second reflecting surface being arranged at two different positions respectively apart from an optical axis of the light source by a specified distance in the predetermined direction.

29. A lighting optical system in accordance with claim 23, wherein the optical path shifting means comprises a transparent member arranged to be inclined relative to a surface of the second lens array.

30. A lighting optical system in accordance with claim 23, the lighting optical system further comprising:

a polarizing element disposed at a position between the second lens array and the optical path shifting means, wherein the polarizing element comprises:

a polarization beam splitter array which has plural sets of a polarization separating film and a reflecting film that are parallel to each other, the polarization beam splitter array separating each of the plurality of partial light fluxes passing through the plurality of small lenses of the second lens array into two types of linear polarized light components; and a polarizer which equalizes polarizing directions of the two types of linear polarized light components separated by the polarization beam splitter array, and wherein the optical path shifting means shifts part of optical paths of the two types of linear polarized light components, which pass through the plurality of small lenses arranged in the predetermined direction and are separated by the polarization beam splitter array, from the other optical paths.

31. A lighting optical system in accordance with claim 30, wherein an amount of shift by which the part of the optical paths of the two types of linear polarized light components are shifted from the other optical paths by the optical path shifting means is approximately half a distance between adjoining optical paths of the two types of linear polarized light components.

32. A lighting optical system in accordance with claim 23, the lighting optical system further comprising:

a superposing optical system which superposes a plurality of partial light fluxes passing through the first lens array and the second lens array to illuminate the three light modulation means, wherein the optical path shifting means is disposed between the second lens array and the superposing optical system.

33. A lighting optical system that emits light, the lighting optical system comprising:

a first lens array having a plurality of small lenses that divide a light flux emitted from a light source into a plurality of partial light fluxes; and a second lens array having a plurality of small lenses that respectively correspond to the plurality of small lenses of the first lens array, each of the first lens array and the second lens array being divided in a direction of rows perpendicular to a predetermined direction into a plurality of rows each having a plurality of small lenses, wherein rows located respectively apart from an optical path of the light source by a specified distance in the predetermined direction are arranged at positions shifted from the other rows by a fixed amount of shift.

34. A lighting optical system in accordance with claim 33, wherein the light source comprises a light-source lamp and a concave mirror that reflects light emitted from the light-source lamp, and the specified distance is substantially equal to a focal distance of the concave mirror.

35. A lighting optical system that emits light, the lighting optical system comprising:

a first lens array having a plurality of small lenses that divide a light flux emitted from a light source into a plurality of partial light fluxes; and a second lens array having a plurality of small lenses that respectively correspond to the plurality of small lenses of the first lens array, each of the first lens array and the second lens array being divided in a direction of rows perpendicular to a predetermined direction into a plurality of rows each having a plurality of small lenses, wherein at least part of the rows among the plurality of rows are arranged at a position shifted from the other rows, and a number of rows whose small lenses are arranged at identical positions in a direction perpendicular to the direction of rows is set to be not greater than two fifths of a total number of the plurality of rows.

36. A lighting optical system in accordance with claim 35, wherein the plurality of rows in the first lens array and the second lens array are shifted from one another by a fixed amount of shift.

* * * * *